(12) United States Patent
Nagasawa

(10) Patent No.: US 11,880,898 B2
(45) Date of Patent: Jan. 23, 2024

(54) ORDER RECEIVING MANAGEMENT DEVICE, ORDER RECEIVING MANAGEMENT SYSTEM, ORDER RECEIVING MANAGEMENT METHOD, AND PROGRAM

(71) Applicant: MEDIPAL HOLDINGS CORPORATION, Tokyo (JP)

(72) Inventor: Kazunori Nagasawa, Tokyo (JP)

(73) Assignee: MEDIPAL HOLDINGS CORPORATION, Tokyo (JP)

(*) Notice: Subject to any disclaimer, the term of this patent is extended or adjusted under 35 U.S.C. 154(b) by 145 days.

(21) Appl. No.: 16/483,382

(22) PCT Filed: Jan. 29, 2018

(86) PCT No.: PCT/JP2018/002694
§ 371 (c)(1),
(2) Date: Aug. 2, 2019

(87) PCT Pub. No.: WO2018/150855
PCT Pub. Date: Aug. 23, 2018

(65) Prior Publication Data
US 2020/0013134 A1   Jan. 9, 2020

(30) Foreign Application Priority Data
Feb. 20, 2017   (JP) ................. 2017-029238

(51) Int. Cl.
*G06Q 50/28*   (2012.01)
*G06Q 10/1093*   (2023.01)
*G06Q 30/0601*   (2023.01)

(52) U.S. Cl.
CPC ......... *G06Q 50/28* (2013.01); *G06Q 10/1097* (2013.01); *G06Q 30/0635* (2013.01)

(58) Field of Classification Search
CPC ............... G06Q 50/28; G06Q 10/1097; G06Q 30/0635; G06Q 10/06313;
(Continued)

(56) References Cited

U.S. PATENT DOCUMENTS

2004/0098307 A1   5/2004  Uehara et al.
2004/0098338 A1   5/2004  Uehara et al.
(Continued)

FOREIGN PATENT DOCUMENTS

JP   2002-074081 A   3/2002
JP   2003267449 A *  9/2003
(Continued)

OTHER PUBLICATIONS

Song, et al., Empty Container Repositioning in Liner Shipping, 36 Maritime Policy & Management 4 (2009) at pp. 291-307 (Year: 2009).*

(Continued)

*Primary Examiner* — Charles Guiliano
(74) *Attorney, Agent, or Firm* — MASUVALLEY and PARTNERS; Peter Martinez

(57) ABSTRACT

An object of the present invention is to manage not only a delivery schedule of an article but also a collection schedule of a container to be collected appropriately and efficiently. Provided is an order receiving management device including an order receiving management server 11 that receives use date data 29 by distributing user-specific calendar screen data 23 from a user-specific calendar generation part 21 to a client terminal 3, and controls a schedule calculation part 31 so as to generate order receiving data 37 based on the use date data 29 with respect to an order-receiving data generation part 35.

1 Claim, 22 Drawing Sheets

(58) Field of Classification Search
CPC ......... G06Q 10/06315; G06Q 30/0201; G06Q 10/0637; B65G 61/00
USPC ...................................................... 705/7.21
See application file for complete search history.

(56) References Cited

U.S. PATENT DOCUMENTS

| | | |
|---|---|---|
| 2004/0215572 A1 | 10/2004 | Uehara et al. |
| 2011/0093388 A1 | 4/2011 | Uehara et al. |
| 2012/0226583 A1 | 9/2012 | Uehara et al. |
| 2012/0226584 A1 | 9/2012 | Uehara et al. |
| 2013/0117696 A1* | 5/2013 | Robertson .............. G16H 20/10 715/763 |
| 2014/0156522 A1 | 6/2014 | Uehara et al. |
| 2014/0278508 A1* | 9/2014 | Akdogan .................. A61J 7/02 705/2 |

FOREIGN PATENT DOCUMENTS

| | | |
|---|---|---|
| JP | 2004-259099 A | 9/2004 |
| JP | 2006-259993 A | 9/2006 |
| JP | 2007-305166 A | 11/2007 |

OTHER PUBLICATIONS

WIPO, Japanese International Search Authority, International Search Report (with English Translation) and Written Opinion dated Apr. 3, 2018 in International Patent Application No. PCT/JP2018/002694, 10 pages.

Extended European Search Report dated Jun. 2, 2020 for European Application No. 18754361.6, 8pages.

Distributed computing—Wikipedia, the free encyclopedia issued on Jun. 28, 2015, XP055303629 12pages.

* cited by examiner

[ER DIAGRAMS OF USER-SPECIFIC CALENDAR GENERATION UNIT]

[ER DIAGRAMS OF USER-SPECIFIC CALENDAR GENERATION UNIT]

FIG.10(d)  
JUDGE DELETION FLAG

USER MASTER ~137

| | |
|---|---|
| PK | USER ID |
| | USER AVAILABLE SECTION |

FIG.10(e)  
ACQUIRE CUSTOMER LIST

CUSTOMER-SPECIFIC ARTICLE MASTER ~139

| | |
|---|---|
| PK | CUSTOMER CODE |
| PK | ARTICLE CODE |
| PK | APPLICATION START DATE AND YEAR |
| | APPLICATION END DATE AND YEAR |
| | DELIVERY AMOUNT |

FIG.10(f)  
ACQUIRE PATIENT LIST

PATIENT MASTER ~141

| | |
|---|---|
| PK | CUSTOMER CODE |
| PK | PATIENT CODE |
| | USER SECTION |
| | ATTRIBUTE |
| | FAMILY NAME IN KANJI |
| | GIVEN NAME IN KANJI |
| | NAME IN KANJI |
| | FAMILY NAME IN KATAKANA |
| | GIVEN NAME IN KATAKANA |
| | NAME OF PLACE OF WORK |
| | TYPE OF WORK |
| | PREFECTURE CODE |
| | ADDRESS (PREFECTURE, COUNTRY) IN KANJI |
| | CITY NAME IN KANJI |
| | ADDRESS (PREFECTURE, COUNTRY) IN KATAKANA |
| | CITY NAME IN KATAKANA |
| | PHONE NUMBER |
| | FAX NUMBER |
| | EMAIL ADDRESS |
| | PRESENCE OF MANUFACTURER'S AUTHORITY |
| | UPDATE DATE |
| | REGISTRATION DATE |
| | TIME STAMP |

[ER DIAGRAMS OF USER-SPECIFIC CALENDAR GENERATION UNIT]

ACQUIRE CANCELLATION YEAR AND DATE

ACQUIRE EVENT

[ER DIAGRAM OF ORDER-RECEIVING DATA GENERATION UNIT]

FIG.11(a) — ACQUIRE DELIVERY TIME AND ALLOCATED WAREHOUSE

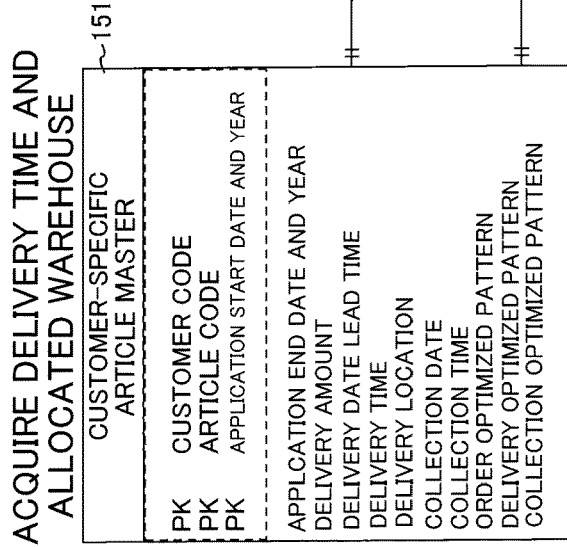

151 — CUSTOMER-SPECIFIC ARTICLE MASTER
- PK  CUSTOMER CODE
- PK  ARTICLE CODE
- PK  APPLICATION START DATE AND YEAR
- APPLICATION END DATE AND YEAR
- DELIVERY AMOUNT
- DELIVERY DATE LEAD TIME
- DELIVERY TIME
- DELIVERY LOCATION
- COLLECTION DATE
- COLLECTION TIME
- ORDER OPTIMIZED PATTERN
- DELIVERY OPTIMIZED PATTERN
- COLLECTION OPTIMIZED PATTERN

FIG.11(b) — ORDER RECEIVING DATA

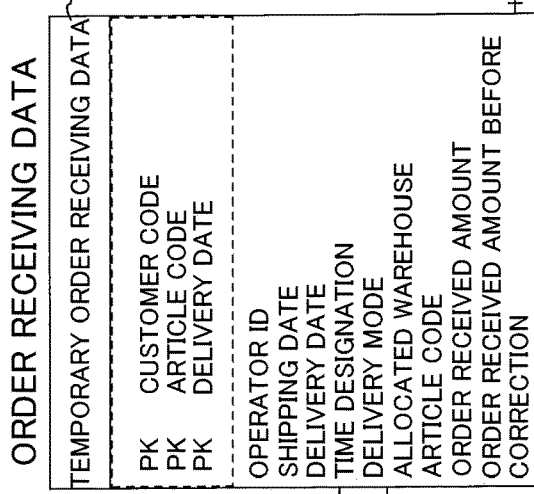

152 — TEMPORARY ORDER RECEIVING DATA
- PK  CUSTOMER CODE
- PK  ARTICLE CODE
- PK  DELIVERY DATE
- OPERATOR ID
- SHIPPING DATE
- DELIVERY DATE
- TIME DESIGNATION
- DELIVERY MODE
- ALLOCATED WAREHOUSE
- ARTICLE CODE
- ORDER RECEIVED AMOUNT
- ORDER RECEIVED AMOUNT BEFORE CORRECTION

FIG.11(c) — ACQUIRE MANUFACTURER CODE

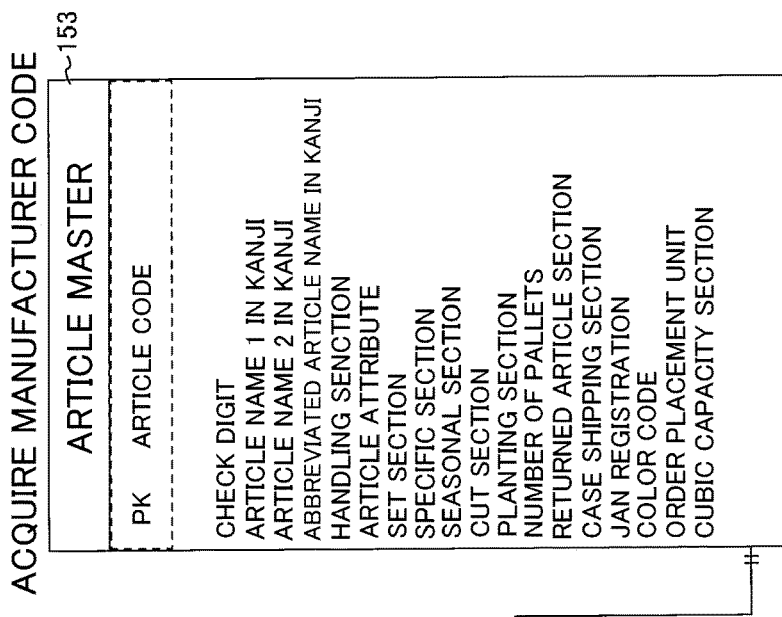

153 — ARTICLE MASTER
- PK  ARTICLE CODE
- CHECK DIGIT
- ARTICLE NAME 1 IN KANJI
- ARTICLE NAME 2 IN KANJI
- ABBREVIATED ARTICLE NAME IN KANJI
- HANDLING SENCTION
- ARTICLE ATTRIBUTE
- SET SECTION
- SPECIFIC SECTION
- SEASONAL SECTION
- CUT SECTION
- PLANTING SECTION
- NUMBER OF PALLETS
- RETURNED ARTICLE SECTION
- CASE SHIPPING SECTION
- JAN REGISTRATION
- COLOR CODE
- ORDER PLACEMENT UNIT
- CUBIC CAPACITY SECTION

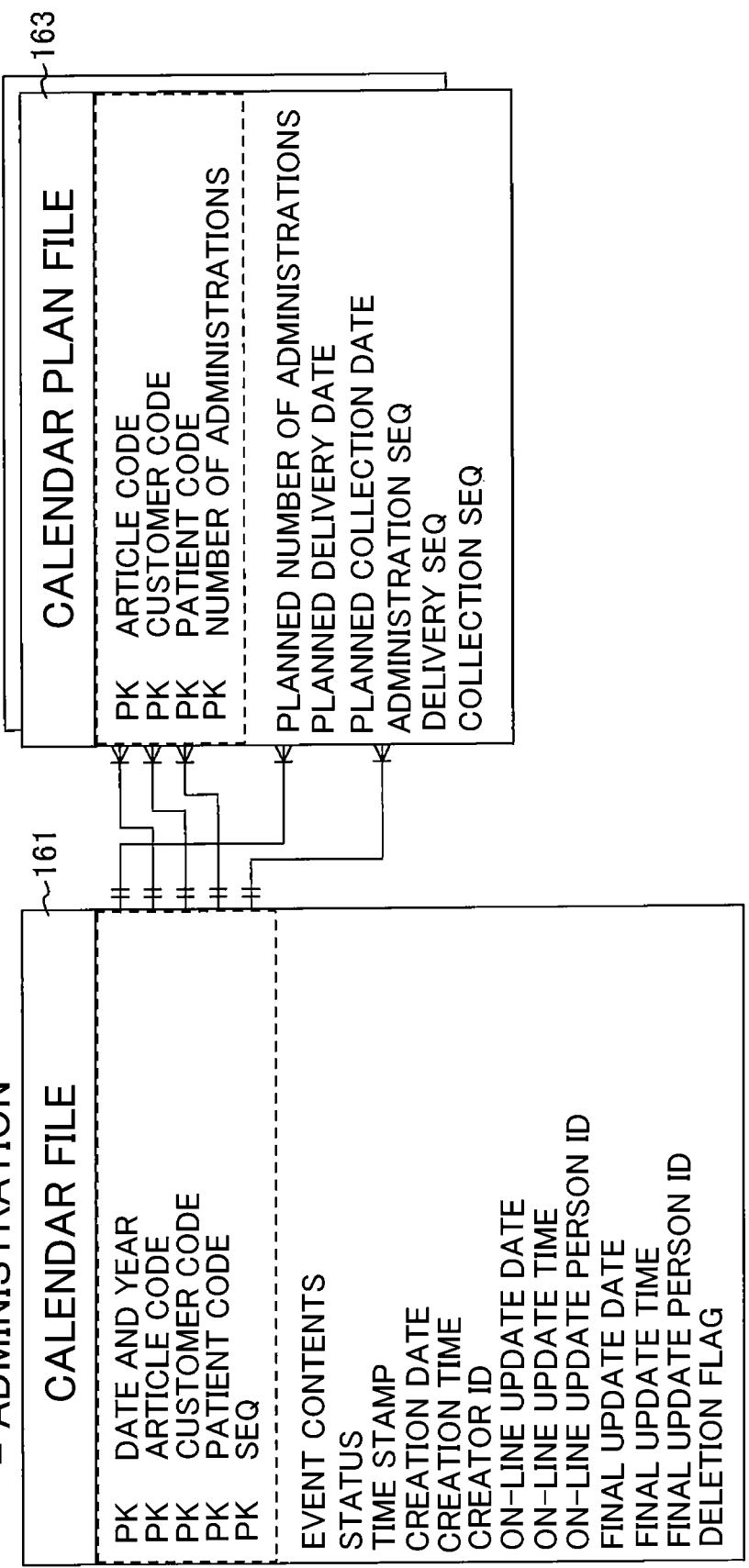

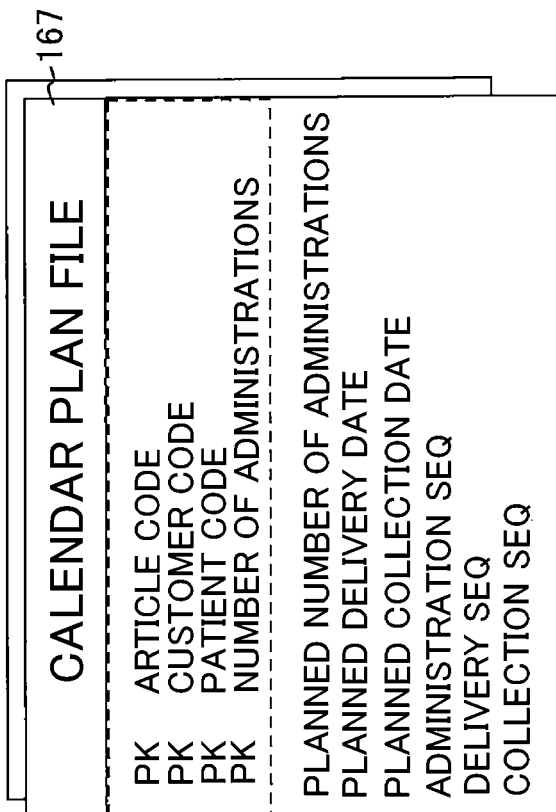
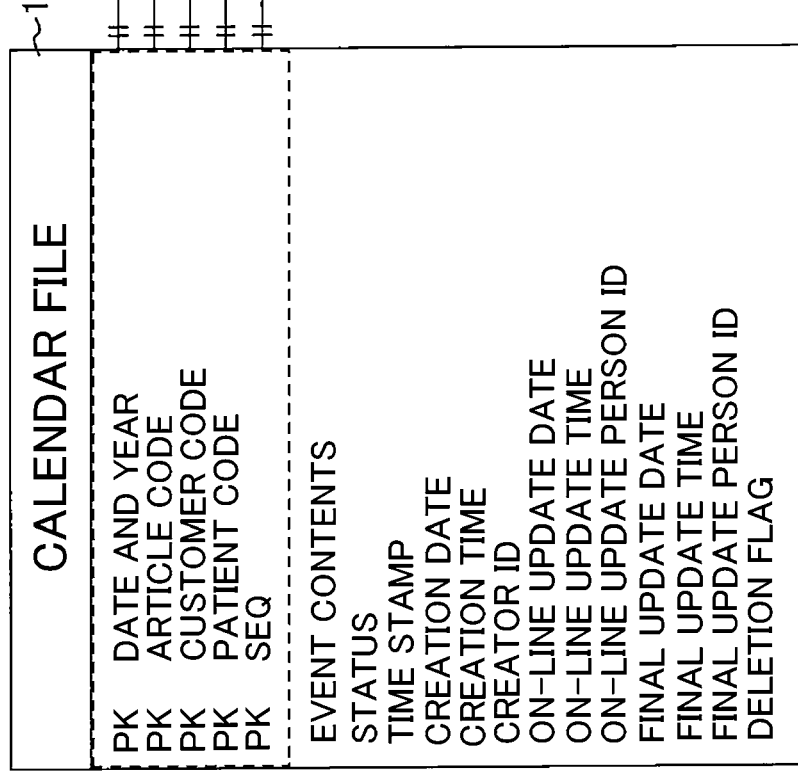

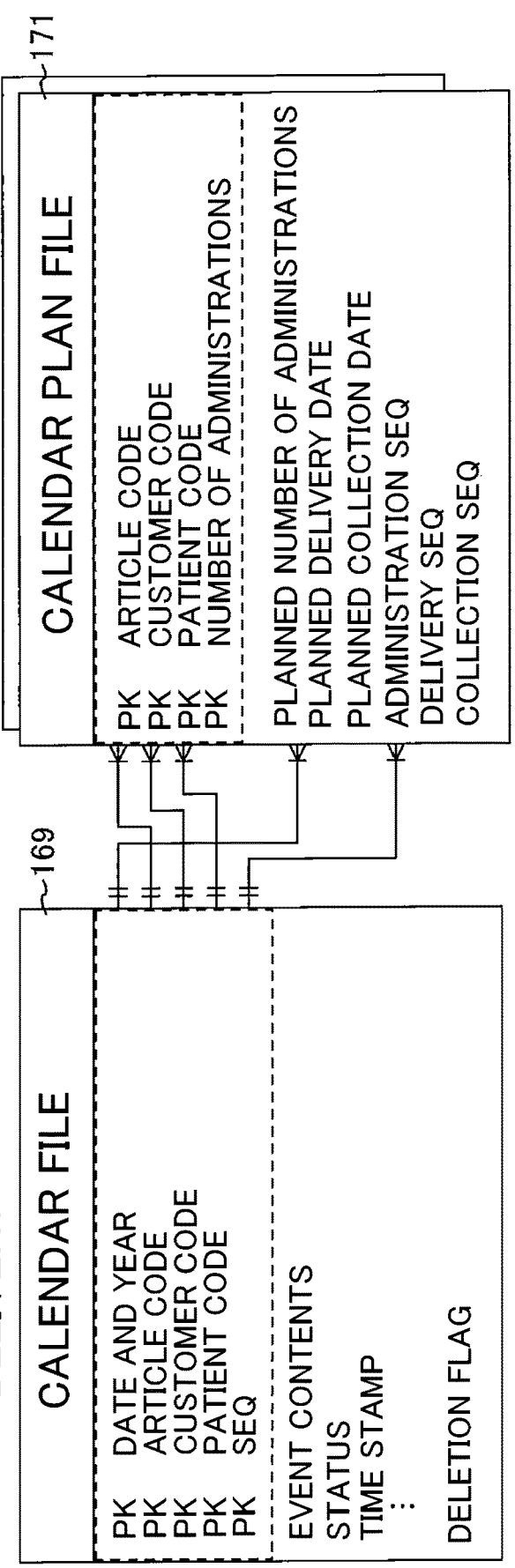

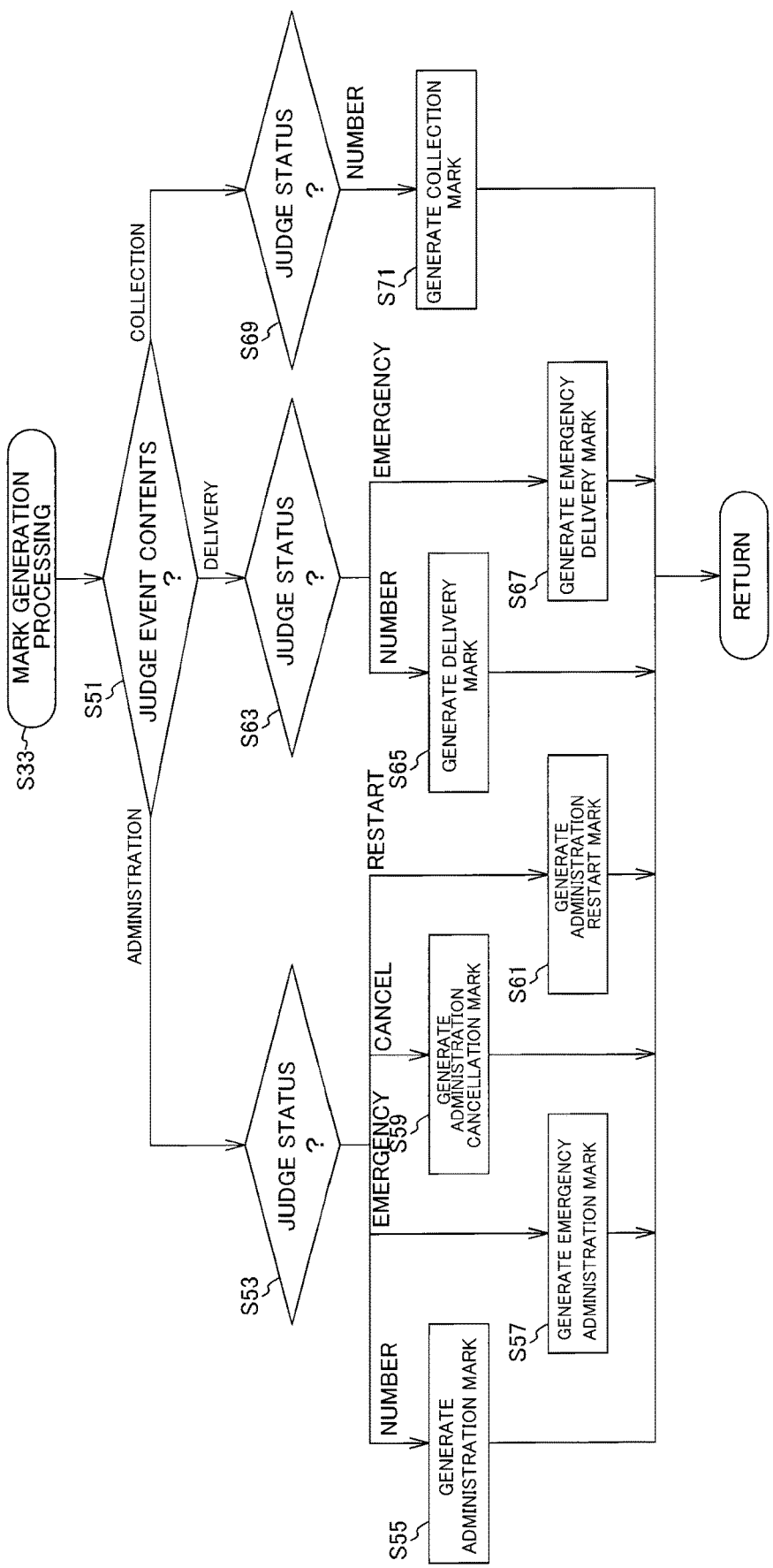
FIG.14(a) [SUBROUTINE OF MARK GENERATION PROCESSING]

FIG.14(b)

| REFERENCE | M55 | M57 | M59 | M61 | M65 | M67 | M71 |
|---|---|---|---|---|---|---|---|
| NAME | ADMINISTRATION MARK | EMERGENCY ADMINISTRATION MARK | ADMINISTRATION CANCELLATION MARK | ADMINISTRATION RESTART MARK | DELIVERY MARK | EMERGENCY DELIVERY MARK | COLLECTION MARK |
| MARK | ③ | EMERGENCY | CANCEL | 10(RE) | ⑤ | EMERGENCY | ② |

ORDER RECEIVING MANAGEMENT DEVICE, ORDER RECEIVING MANAGEMENT SYSTEM, ORDER RECEIVING MANAGEMENT METHOD, AND PROGRAM

RELATED APPLICATIONS

This application is the U.S. National Phase of and claims priority to International Patent Application No. PCT/JP2018/002694, International Filing Date Jan. 29, 2018, entitled Order Receiving Management Device, Order Receiving Management System, Order Receiving Management Method, And Program; which claims priority to Japanese Application No. 2017-029238 filed Feb. 20, 2017; both of which are incorporated herein by reference in their entireties.

FIELD

The present invention relates to an order receiving management device, an order receiving management system, an order receiving management method, and a program.

BACKGROUND

In order to deliver make-to-order articles on a set delivery date after having received an order from a customer, a delivery management device that calculates a production due date, an arrival date, and a shipping due date after receiving an article order and outputs instruction data has been known conventionally.

As an example of the conventional delivery management device, Patent Literature 1 has been known.

Patent Literature 1 has an object of providing a delivery management device that issues a delivery instruction in order to deliver make-to-order articles, for which an order has been received, on a set delivery date. Upon reception of order information of make-to-order products, the delivery management device adds a predetermined number of days for determining a production due date to the date when the order information has been received to calculate the production due date, and calculates an arrival date by adding thereto a predetermined number of days until the delivery date.

Further, Patent Literature 1 discloses a technique in which a shipping due date is calculated by tracing back a delivery period from the calculated arrival date, to output instruction data including the information of a production due date and a shipping due date.

More specifically, a manufacturer can present the production due date and the shipping due date for delivering ordered products to a customer by a uniform delivery period. Therefore, there is an advantage that a period for storing manufactured products in a factory can be reduced to reduce the stocks.

CITATION LIST

Patent Literature

Patent Literature 1: Japanese Patent Application Laid-open No. 2006-259993

SUMMARY

Technical Problem

However, in Patent Literature 1, stock management associated with the delivery of products is a main object thereof. Therefore, there is a problem that, for example, when the products are delivered in a container or a circulate box, management with respect to collection of the container or the circulate box cannot be performed properly.

Stock management of drugs handled by medical organizations not only requires high expertness and advanced knowledge regarding the handling thereof due to its nature, but also requires storage and careful delivery of the drugs in a special container depending on the drugs.

Accordingly, it has been desired to develop an order receiving management device that can manage not only a delivery schedule of articles but also an appropriate collection schedule of a container or the like to be collected.

The present invention has been achieved in view of the above problems, and an object of the present invention is to manage not only a delivery schedule of articles but also a collection schedule of containers to be collected appropriately and efficiently.

Solution to Problem

In order to solve the above problem, an invention according to claim 1 is an order receiving management device that transmits user-specific order receiving data associated with an article received from an orderer terminal of an orderer via a network to a logistics management server of a deliverer who stores the article in a container and delivers the article to the orderer, the order receiving management device comprising: a calendar-screen data generation unit that generates user-specific calendar screen data in which a plurality of date regions are arranged per month; a distribution unit that distributes the user-specific calendar screen data to the orderer terminal; a reception unit that receives use date data specified in the user-specific calendar screen data from the orderer terminal; a schedule calculation unit that calculates delivery date data representing a schedule for delivering the article and collection date data representing a schedule for collecting the container after being used for delivering the article based on the received use date data; an order-receiving data generation unit that generates order receiving data including the delivery date data, the use date data, and the collection date data associated with the article, user identification data of a user who uses the article, and delivery address data of the article; and a transmission unit that transmits the generated order receiving data to the logistics management server.

Advantageous Effects of Invention

According to the present invention, it is possible to manage not only a delivery schedule of articles but also a collection schedule of containers to be collected appropriately and efficiently.

BRIEF DESCRIPTION OF DRAWINGS

FIGS. 10(a) to (i) are ER diagrams illustrating relations between various masters and data in a database with respect to articles.

FIGS. 11(a) to (c) are ER diagrams illustrating an order-receiving data generation unit of the present invention.

FIGS. 12(a) to (f) are ER diagrams illustrating association with respective events from an event record of the present invention.

FIG. 14(a) is a flowchart for explaining an operation of a subroutine of mark generation processing in the mark generation unit according to the present invention, and FIG. 14(b) is a mark table used for the mark generation processing.

DESCRIPTION OF EMBODIMENTS

Figure 1:
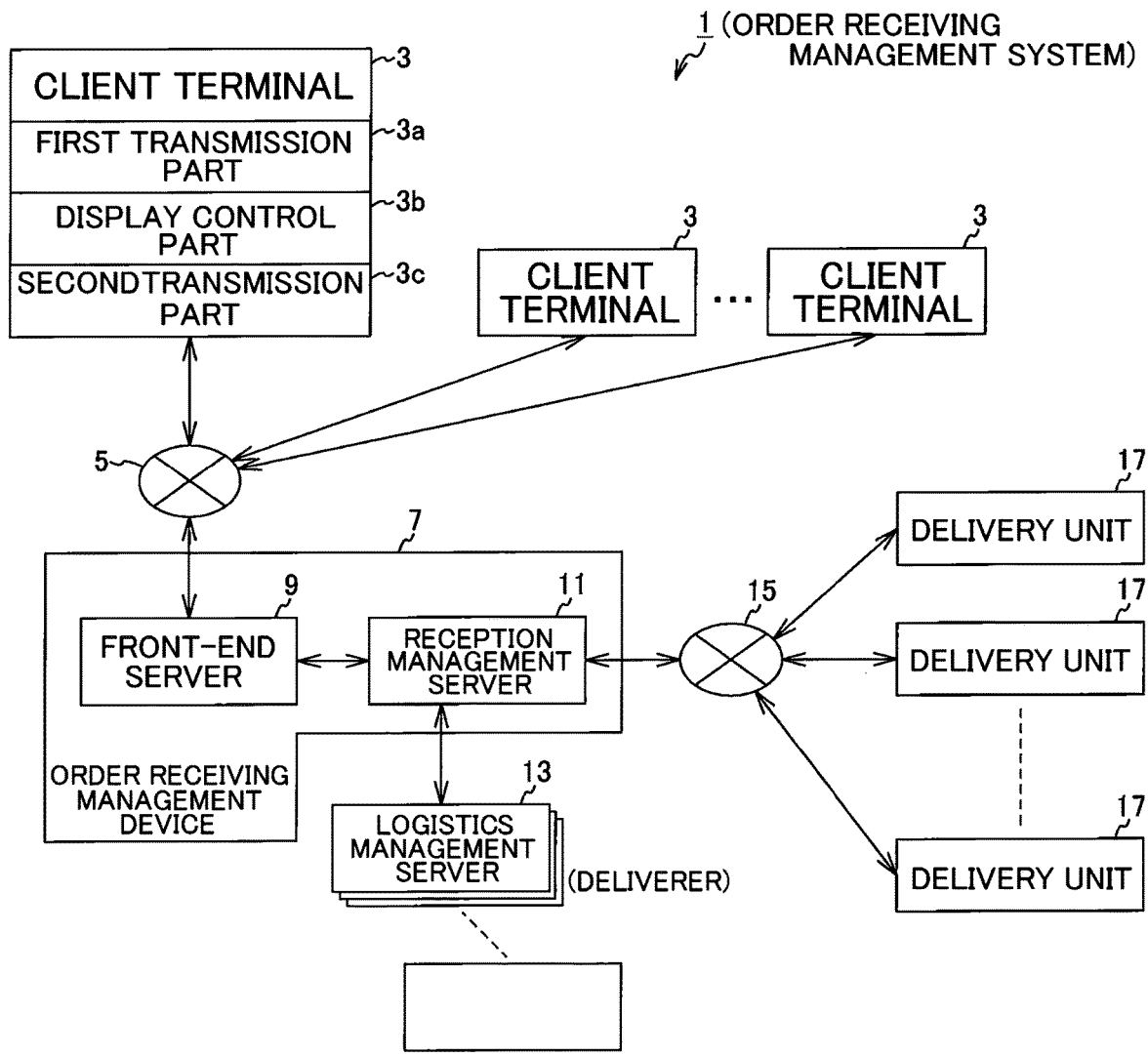
FIG. 1 is a block diagram of an order receiving management system according to one embodiment of the present invention.

The present invention will be described below with an embodiment illustrated in the drawings.

<Overall Configuration of Order Receiving Management System>

The present invention has a configuration described below in order to manage not only a delivery schedule of articles but also a collection schedule of a container to be collected appropriately and efficiently.

That is, an order receiving management system according to the present invention is an order receiving management device that transmits order receiving data associated with an article received from an orderer terminal of an orderer via a communication network to a logistics management server of a deliverer who stores the article in a container and delivers the article to the orderer. The order receiving management system includes a calendar-screen data generation unit that generates user-specific calendar screen data in which a plurality of date regions are arranged per month, a distribution unit that distributes the user-specific calendar screen data to the orderer terminal, a reception unit that receives use date data specified in the user-specific calendar screen data from the orderer terminal, a schedule calculation unit that calculates delivery date data representing a schedule for delivering the article and collection date data representing a schedule for collecting the container after being used for delivering the article based on the received use date data, an order-receiving data generation unit that generates order receiving data including the delivery date data, the use date data, and the collection date data associated with the article, user identification data of a user who uses the article, and delivery address data of the article, and a transmission unit that transmits the generated order receiving data to the logistics management server.

By having the above configuration, not only delivery of the article, but also stock management of the container to be collected can be performed appropriately and efficiently.

With respect to the characteristics of the present invention described above, detailed explanations are provided with reference to the drawings.

First Embodiment

<Order Receiving Management System>

FIG. 1 is a block diagram of an order receiving management system according to one embodiment of the present invention.

An order receiving management system 1 is configured by a client terminal (orderer terminal) 3, networks 5 and 15, an order receiving management device 7, a logistics management server 13, a delivery unit 17, and the like. According to the present embodiment, the client terminal 3, the logistics management server 13, and the delivery unit (container) 17 are respectively provided in plural. However, each of these elements can be provided singly. Further, the network is divided into the network 5 and the network 15. However, these networks can be configured by the same network.

In the order receiving management system 1, client terminals 3 (generally, PCs) installed in medical organizations such as hospitals and doctor's offices, pharmacies, drug manufacturers, and the like are connected to the order receiving management device 7 according to the present invention via the network 5.

The order receiving management device 7 is configured to include a front-end server 9 and a order receiving management server 11.

The front-end server 9 has a function of receiving data from the client terminal 3 via the network 5 to provide direct access service to the client terminals 3 and change a display format.

The client terminal 3 is a terminal operable by an orderer and is configured by a first transmission part 3a, a display control part 3b, and a second transmission part 3c described later.

The order receiving management server 11 has a function of generating respective pieces of order receiving data based on the use date data received from the respective client terminals 3 and transmitting the generated pieces of order receiving data to the logistics management server 13 of a deliverer, and a function of generating user-specific calendars corresponding to the respective clients and transmitting the generated calendars to the client terminals 3.

Further, the order receiving management server 11 receives data of a dedicated delivery unit 17 via the network 15 to manage the state of each delivery unit 17.

The order receiving management server 11 has therein a ROM (Read Only Memory), a RAM (Random Access Memory), a CPU (Central Processing Unit), and an HDD (Hard Disk Drive). The reception management server 11 reads an operating system OS from the HDD and develops the OS on the RAM to activate the OS, and reads programs (programs indicated by various flowcharts described later) from the HDD to perform various types of processing, under control of the OS.

The logistics management server 13 is arranged in each warehouse that stores each article or in each warehouse that stores a plurality of articles, and executes control for shipping a corresponding article to a client upon reception of a request from the order receiving management server 11.

The delivery unit 17 has a function of loading special drugs required to be maintained, for example, in a predetermined low-temperature state on a carriage with a liquid nitrogen cylinder or the like, and informing the order receiving management server 11 of the temperature thereof via the network 15. Therefore, after the drugs are delivered to the client, it is necessary to collect the delivery unit 17 having stored the drugs therein.

<Configuration of Order Receiving Management Server>

Figure 2:
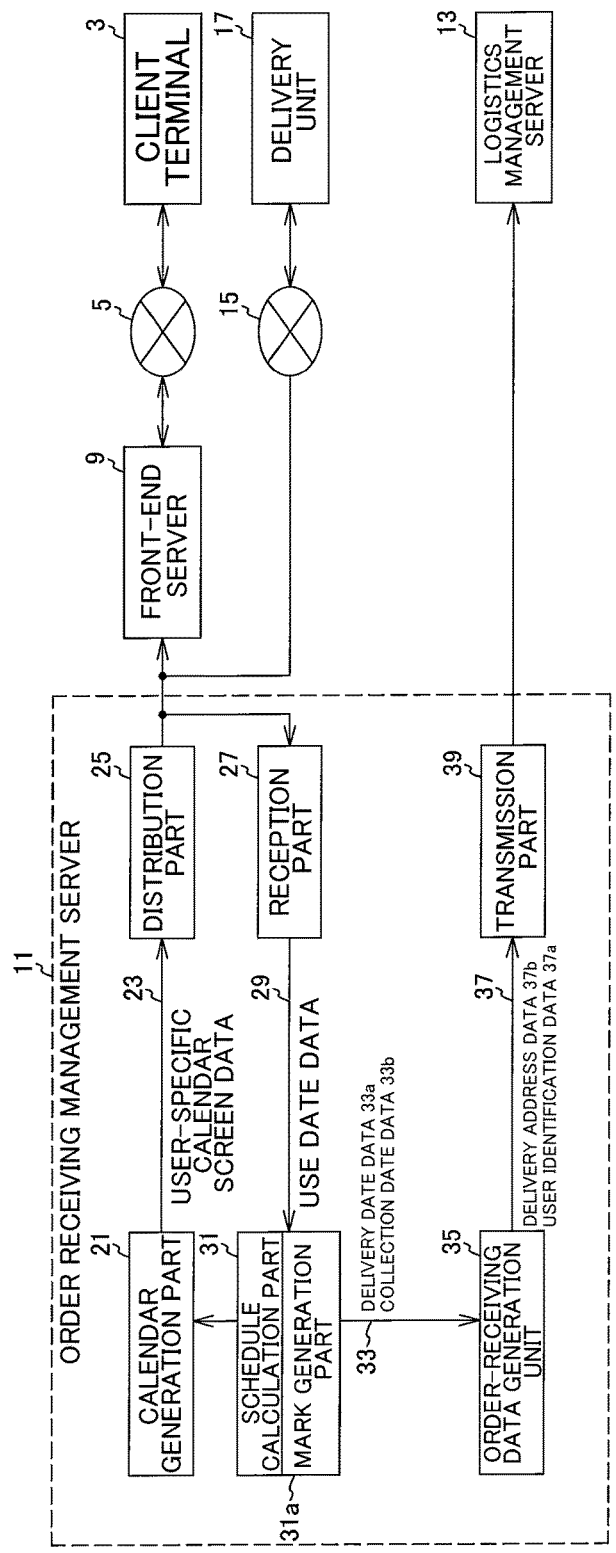
FIG. 2(a) is a block diagram illustrating a configuration of an order receiving management server according to the embodiment of the present invention.
FIG. 2(b) is a diagram illustrating a configuration of order receiving data.
FIG. 2(c) is a diagram illustrating a configuration of user-specific calendar screen data.

FIG. 2(*a*) is a block diagram illustrating a configuration of the order receiving management server according to the embodiment of the present invention. Like constituent elements are denoted by like reference signs and explained.

According to the present embodiment, as illustrated in FIG. 2(*a*), the order receiving management server 11 includes a calendar generation part 21 (calendar-screen data generation unit), a distribution part 25 (distribution unit), a reception part 27 (reception unit), a schedule calculation part 31 (schedule calculation unit), an order-receiving data generation part 35 (order-receiving data generation unit), and a transmission part 39 (transmission unit).

The calendar generation part 21 generates user-specific calendar screen data 23 in which a plurality of date regions are arranged per month.

The distribution part 25 distributes the user-specific calendar screen data 23 to the client terminal 3 (orderer terminal) via the front-end server 9 and the network 5.

The reception part 27 receives the use date data 29 specified in the user-specific calendar screen data 23 from the client terminal 3 via the network 5 and the front-end server 9.

The schedule calculation part 31 calculates delivery date data 33*a* representing a schedule for delivering an article and collection date data 33*b* representing the schedule for collecting the container after being used for the article, based on the received use date data 29.

The order-receiving data generation part 35 generates order receiving data 37 including the delivery date data 33*a*, the use date data 29, and the collection date data 33*b* associated with the article, user identification data 37*a* of a user who uses the article, and delivery address data 37*b* of the article.

The transmission part 39 transmits the generated order receiving data 37 to the logistics management server 13.

The schedule calculation part 31 includes a mark generation part 31*a* described later. The order receiving management server 11 receives data of the dedicated delivery unit 17 via the network 15 to manage the state of the respective delivery units 17.

The order receiving data 37 and the user-specific calendar screen data 23 illustrated in FIGS. 2(*b*) and (*c*) are described here.

FIG. 2(*b*) illustrates a configuration of the order receiving data 37 and the order receiving data 37 is configured by the delivery date data 33*a*, the collection date data 33*b*, the use date data 29, the user identification data 37*a*, and the delivery address data 37*b*.

Figure 8:
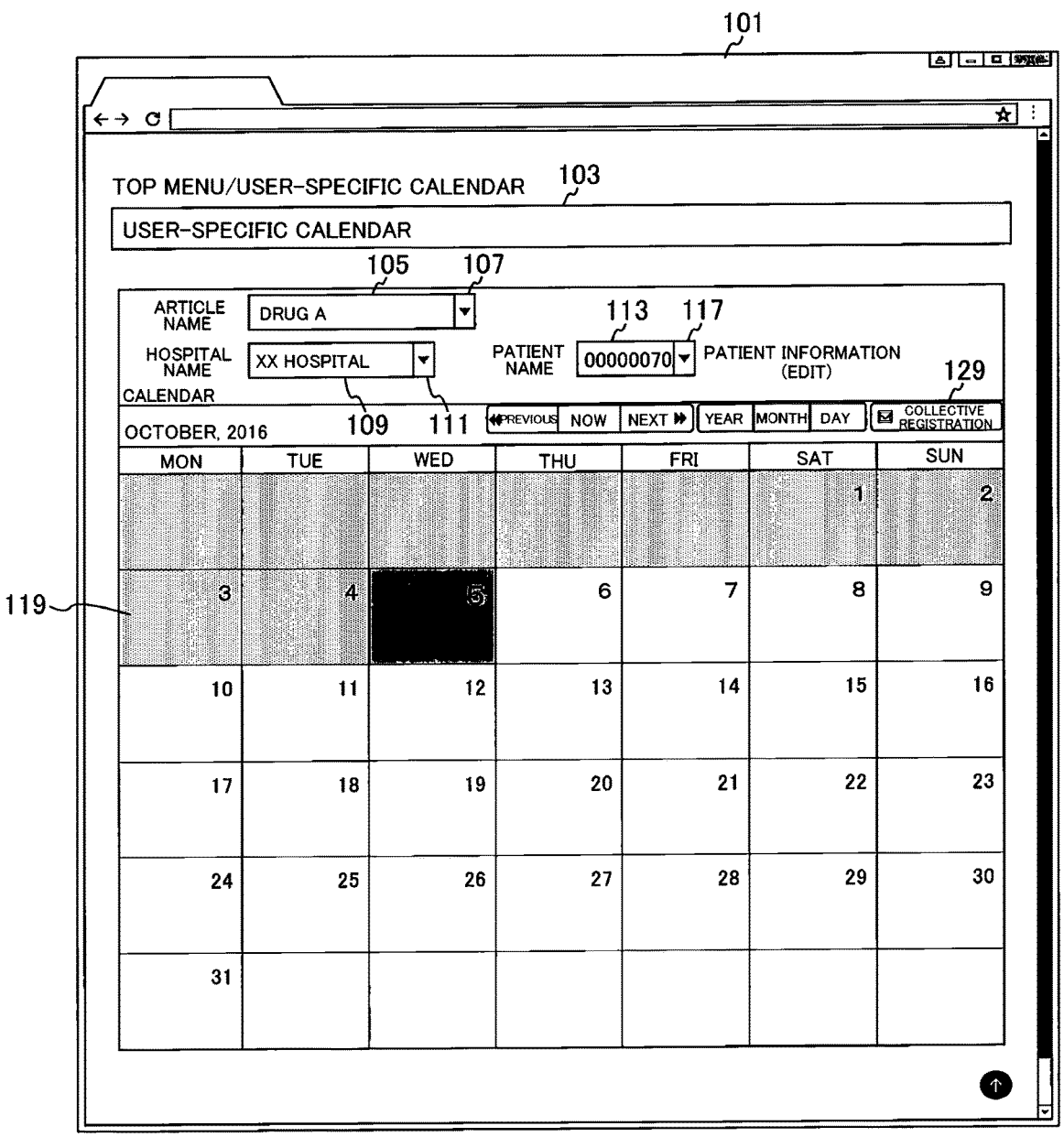
FIG. 8 is a diagram illustrating a user-specific calendar screen in a state of having no administration schedule in a client terminal according to the embodiment of the present invention.

FIG. 2(*c*) illustrates a configuration of the user-specific calendar screen data 23, and the user-specific calendar screen data 23 is configured by an article specification region 105, a user identification region 113, and a delivery address region 109 illustrated in FIG. 8.

<Explanation of Operation>
<Sequence Diagram for Explaining Operation to Distribute User-Specific Calendar Data>

Figure 3:
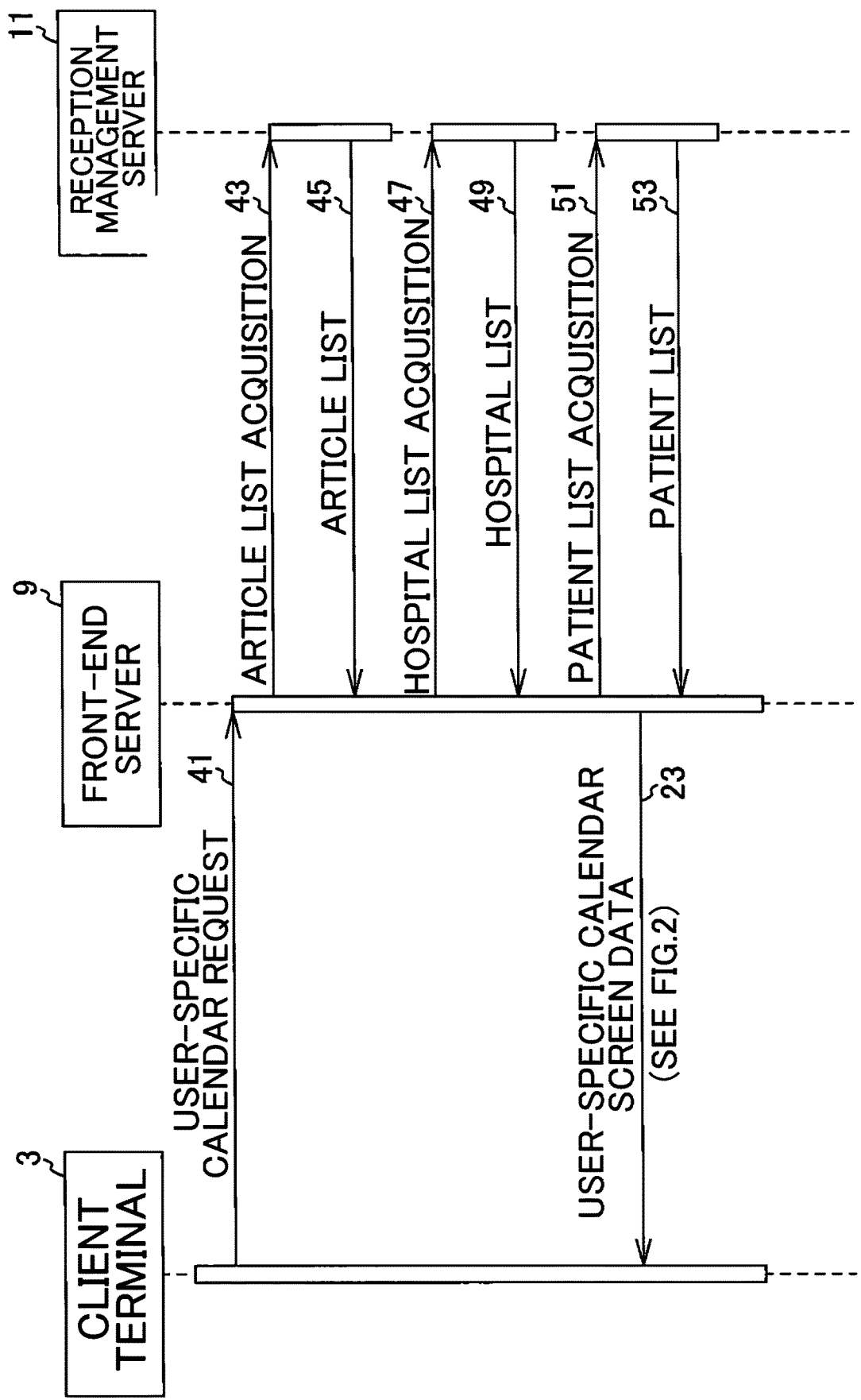
FIG. 3 is a sequence diagram for explaining an operation of the order receiving management server according to the embodiment of the present invention to distribute user-specific calendar data.

FIG. 3 is a sequence diagram for explaining an operation of the order receiving management server 11 according to the embodiment of the present invention to distribute the user-specific calendar data. Like constituent elements are denoted by like reference signs and explained.

In the sequence diagram, the client terminal 3, the front-end server 9, and the order receiving management server 11 are arranged in this order from the left, and each data flow is indicated by an arrow and explained.

First, the client terminal 3 issues a user-specific calendar request 41. The data is input to the front-end server 9 via the network 5. The front-end server 9 searches password and the like, for example, for security management, and authenticates whether the client terminal 3 that has issued a data request is a regular registered user. As a result of authentication, if the user is a regular registered user, the front-end server 9 performs article list acquisition 43, and the order receiving management server 11 transmit data of an article list 45 to the client terminal 3 as the user-specific calendar screen data 23 (see FIG. 2) via the front-end server 9.

Similarly, front-end server 9 performs hospital list acquisition 47 and patient list acquisition 51, and the order receiving management server 11 transmits pieces of data of a hospital list 49 and a patient list 53 to the client terminal 3 as the user-specific calendar screen data 23 (see FIG. 2) via the front-end server 9.

That is, the calendar generation part 21 explained with reference to FIG. 2 generates the user-specific calendar screen data 23 including a region 105 for specifying an article, a region 113 for specifying the user identification data, and a region 109 for specifying the delivery address data, which will be described later with reference to FIG. 8.

<Sequence Diagram for Explaining Operation to Register Scheduled Date Only Once>

Figure 4:
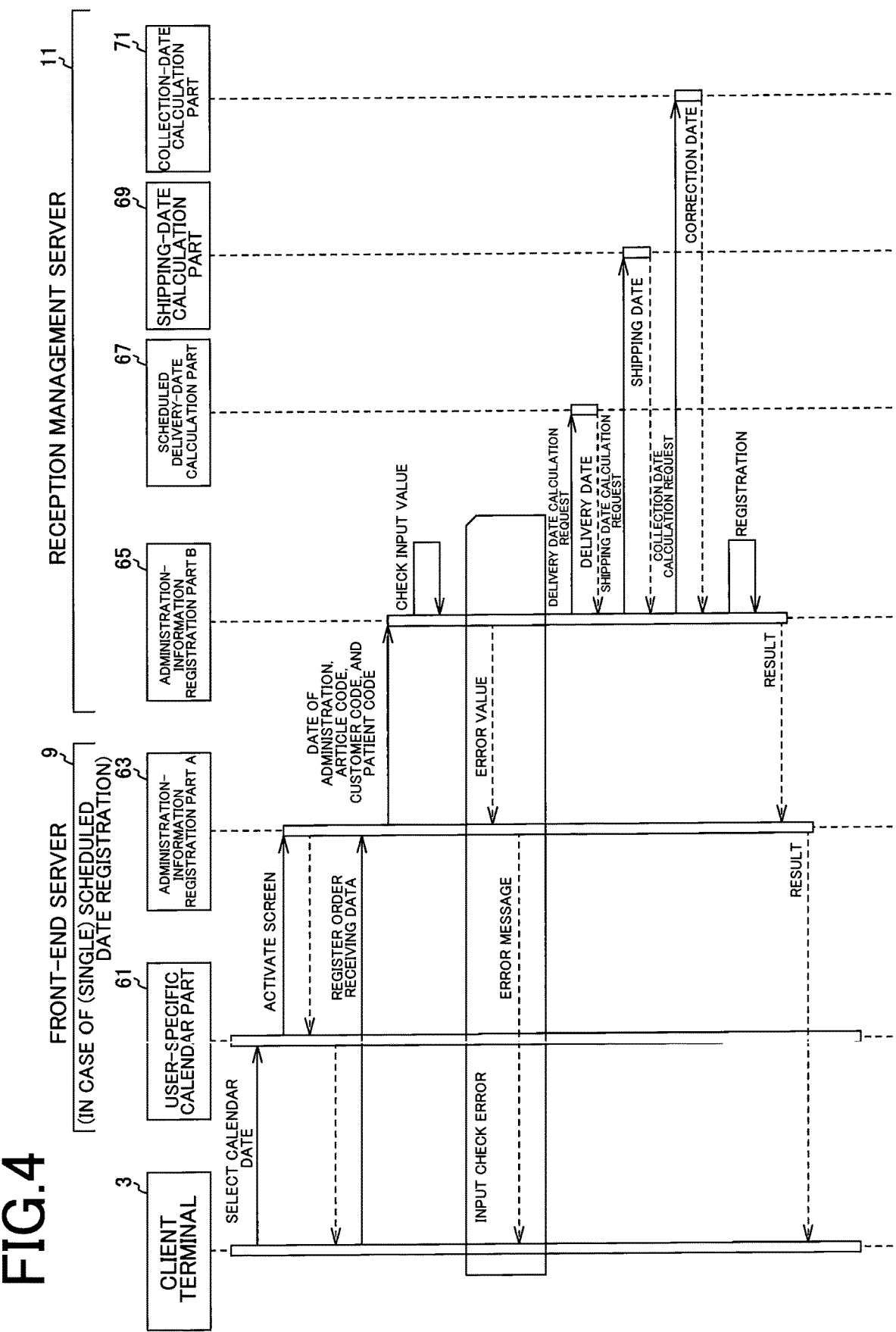
FIG. 4 is a sequence diagram for explaining an operation to register a scheduled date only once performed by the order receiving management server according to the embodiment of the present invention.

FIG. 4 is a sequence diagram for explaining an operation to register a scheduled date only once (singly) performed by the order receiving management server according to the embodiment of the present invention. Like constituent elements are denoted by like reference signs and explained.

In the sequence diagram, the client terminal 3, a user-specific calendar part 61 and an administration-information registration part A 63 in the front-end server 9, and an administration-information registration part B 65, a scheduled delivery-date calculation part 67, a shipping-date calculation part 69, and a collection-date calculation part 71 in the order receiving management server 11 are arranged in this order from the left, and each data flow is indicated by an arrow and explained. It is assumed that an initial screen of a user-specific calendar screen is displayed on the client terminal 3 as described with reference to FIG. 3.

First, the orderer selects a user-specific calendar from a menu displayed on the client terminal 3, and selects an administration scheduled date in the displayed user-specific calendar screen. The data is transmitted to the user-specific calendar part 61, and registered in the administration-information registration part A 63.

Further, upon selection of order receiving data such as a dosage amount from the user-specific calendar screen, the data is registered in the administration-information registration part A 63. As a result, in the administration-information registration part A 63, the date of administration, article code, customer code, and patient code are input to an administration-information registration part B 65 of the order receiving management server 11 and developed to individual/automatic events.

At this time, the administration-information registration part B 65 checks an input value. As check contents, date check, a sales and marketing check list, an administered patient, administration availability, and the like are judged. If the input value is not correct, an error value is transmitted to the administration-information registration part A 63, where an error message is generated and transmitted to the client terminal 3.

Further, if the input value is correct, the administration-information registration part B 65 transmits a delivery date calculation request to the scheduled delivery-date calculation part 67 to acquire the delivery date, transmits a shipping date calculation request to the shipping-date calculation part 69 to acquire the shipping date, and transmits a collection date calculation request to the collection-date calculation part 71 to acquire the collection date.

These pieces of acquired data are registered in the administration-information registration part B 65, and the result thereof is transmitted to the client terminal 3 via the administration-information registration part A 63.

In the client terminal 3, the registered date of administration, the calculated shipping date, and collection date are displayed on a screen.

<Sequence Diagram for Explaining Operation to Register Scheduled Dates Collectively>

Figure 5:
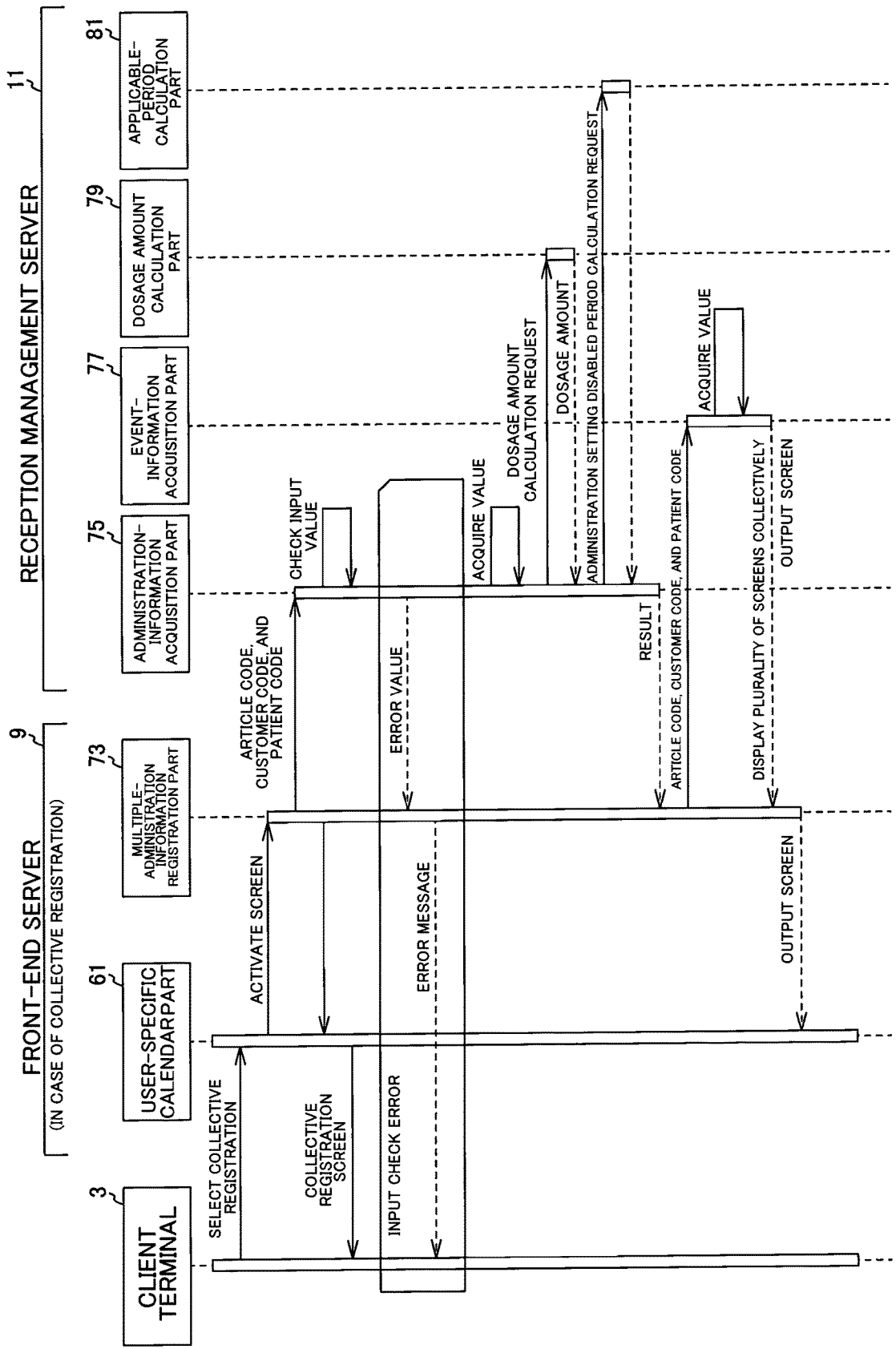
FIG. 5 is a sequence diagram for explaining an operation to register scheduled dates collectively performed by the order receiving management server according to the embodiment of the present invention.

FIG. 5 is a sequence diagram for explaining an operation to register scheduled dates collectively performed by the order receiving management server according to the embodiment of the present invention. Like constituent elements are denoted by like reference signs and explained.

In the sequence diagram, the client terminal 3, the user-specific calendar part 61 and a multiple-administration information registration part 73 in the front-end server 9, and an administration-information acquisition part 75, an event-information acquisition part 77, a dosage amount calculation part 79, and an applicable-period calculation part 81 in the order receiving management server 11 are arranged in this order from the left, and each data flow is indicated by an arrow and explained. It is assumed that the initial screen of the user-specific calendar screen is displayed on the client terminal 3 as described with reference to FIG. 3.

First, an orderer selects a user-specific calendar from the menu displayed on the client terminal 3, and selects collective registration (press a "collective registration" button 129 illustrated in FIG. 8) in the displayed user-specific calendar screen. The data is transmitted to the user-specific calendar part 61 and registered in the multiple-administration information registration part 73.

As a result, the multiple-administration information registration part 73 inputs the article code, the customer code, and the patient code in the administration-information acquisition part 75 of the order receiving management server 11. At this time, the administration-information acquisition part 75 checks an input value. If the input value is not correct, an error value is transmitted to the multiple-administration information registration part 73, where an error message is generated and transmitted to the client terminal 3.

Further, as a result of check, if the input value is correct, the administration-information acquisition part 75 acquires a standard maximum number of repetition and a time stamp, the dosage amount calculation part 79 having received the dosage amount calculation request from the administration-information acquisition part 75 calculates the dosage amount, and the applicable-period calculation part 81 having received an administration-setting disabled period calculation request from the administration-information acquisition part 75 calculates an administration unavailable period.

The administration-information acquisition part 75 transmits the result to the multiple-administration information registration part 73. The event-information acquisition part 77 acquires utilizing user information, patient information, and administration information together with the article code, the customer code, and the patient code from the multiple-administration information registration part 73, and transmits screen output information for displaying a plurality of screens collectively to the multiple-administration information registration part 73. The multiple-administration information registration part 73 transmits the screen output information to the user-specific calendar part 61 as a screen output.

Figure 9:
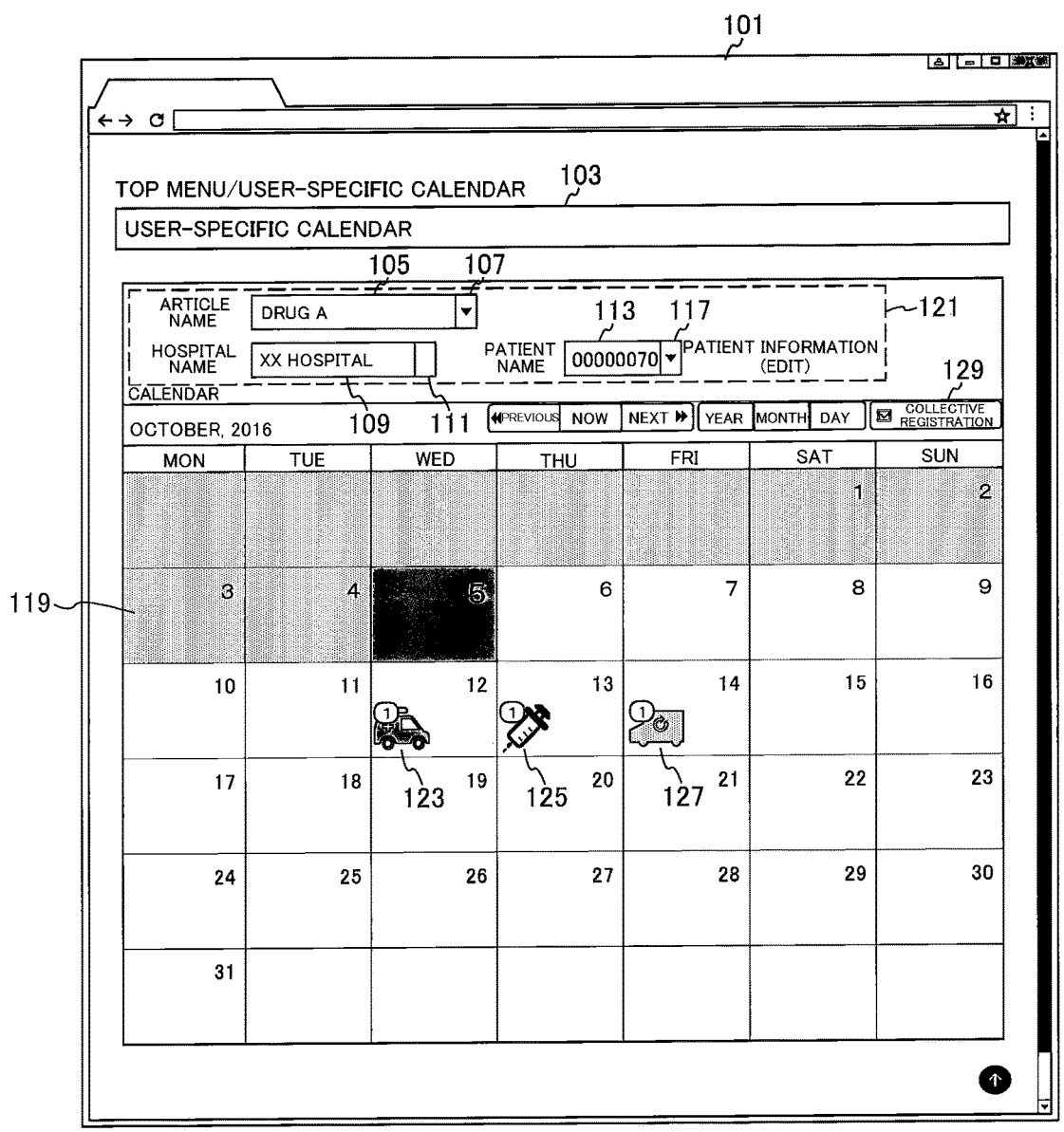
FIG. 9 is a diagram illustrating a user-specific calendar screen in a state of having an administration schedule in the client terminal according to the embodiment of the present invention.

As a result, the client terminal 3 displays the registered date of administration, the calculated delivery date, and collection date on a screen (FIG. 9).

<Sequence Diagram for Explaining Operation to Calculate Delivery Date, Shipping Date, and Collection Date Collectively>

Figure 6:
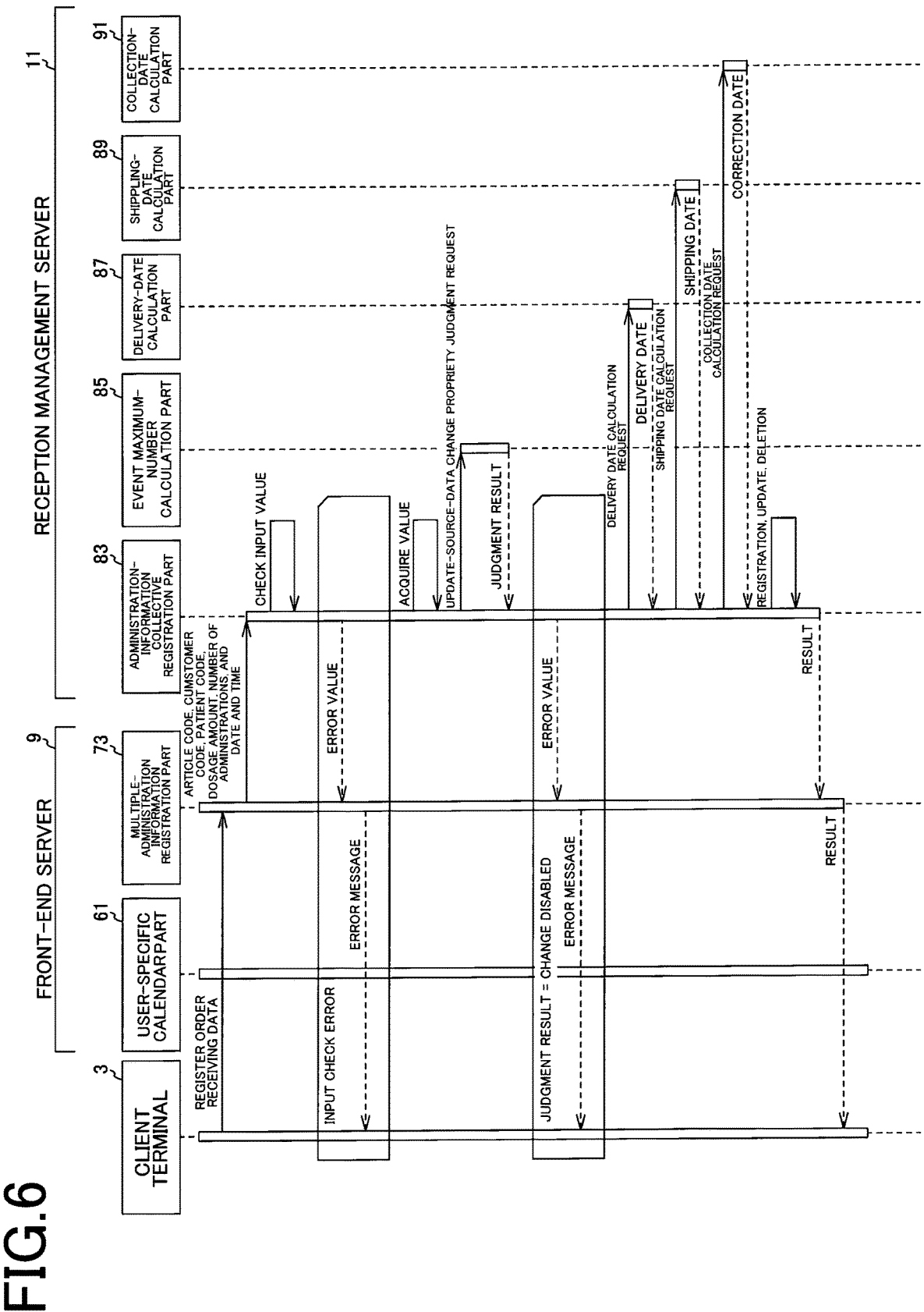
FIG. 6 is a sequence diagram for explaining an operation to calculate a delivery date, a shipping date, and a collection date collectively performed by the order receiving management server according to the embodiment of the present invention.

FIG. 6 is a sequence diagram for explaining an operation to calculate the delivery date, the shipping date, and the collection date collectively performed by the order receiving management server according to the embodiment of the present invention. Like constituent elements are denoted by like reference signs and explained.

In the sequence diagram, the client terminal 3, the user-specific calendar part 61 and the multiple-administration information registration part 73 in the front-end server 9, and an administration-information collective registration part 83, an event maximum-number calculation part 85, a delivery-date calculation part 87, a shipping-date calculation part 89, and a collection-date calculation part 91 in the order receiving management server 11 are arranged in this order from the left, and each data flow is indicated by an arrow and explained. It is assumed that the initial screen of the user-specific calendar screen is displayed on the client terminal 3 as described with reference to FIG. 3.

First, an orderer (client) selects a user-specific calendar from the menu displayed on the client terminal 3, and selects order receiving data registration from the displayed user-specific calendar screen. The data is registered in the multiple-administration information registration part 73.

As a result, the multiple-administration information registration part 73 inputs the article code, the customer code, the patient code, the dosage amount, the number of administrations, and the date and time (date) in the administration-information collective registration part 83 of the order receiving management server 11. At that time, the administration-information collective registration part 83 checks an input value. As a result of check, if the input value is not correct, an error value is transmitted to the multiple-administration information registration part 73, where an error message is generated and transmitted to the client terminal 3.

On the other hand, as the result of check, if the input value is correct, the administration-information collective registration part 83 acquires an operation available maximum date, a set delivery date, and an administration available period. The event maximum-number calculation part 85 having received an update-source-data change propriety judgment request from the administration-information collective registration part 83 calculates a maximum number of events as a result of the change propriety judgment. The delivery-date calculation part 87 having received a delivery date calculation request from the administration-information collective registration part 83 calculates the delivery date. The shipping-date calculation part 89 having received a shipping date calculation request from the administration-information collective registration part 83 calculates the shipping date. The collection-date calculation part 91 having received a collection date calculation request from the administration-information collective registration part 83 calculates the collection date.

The administration-information collective registration part 83 then transmits results of registration, update, and deletion of the calculated delivery date, shipping date, and collection date to the multiple-administration information registration part 73 to register the results and the results are transmitted to the client terminal 3.

<Sequence Diagram for Explaining Order Receiving Operation Performed by Using User-Specific Calendar>

Figure 7:
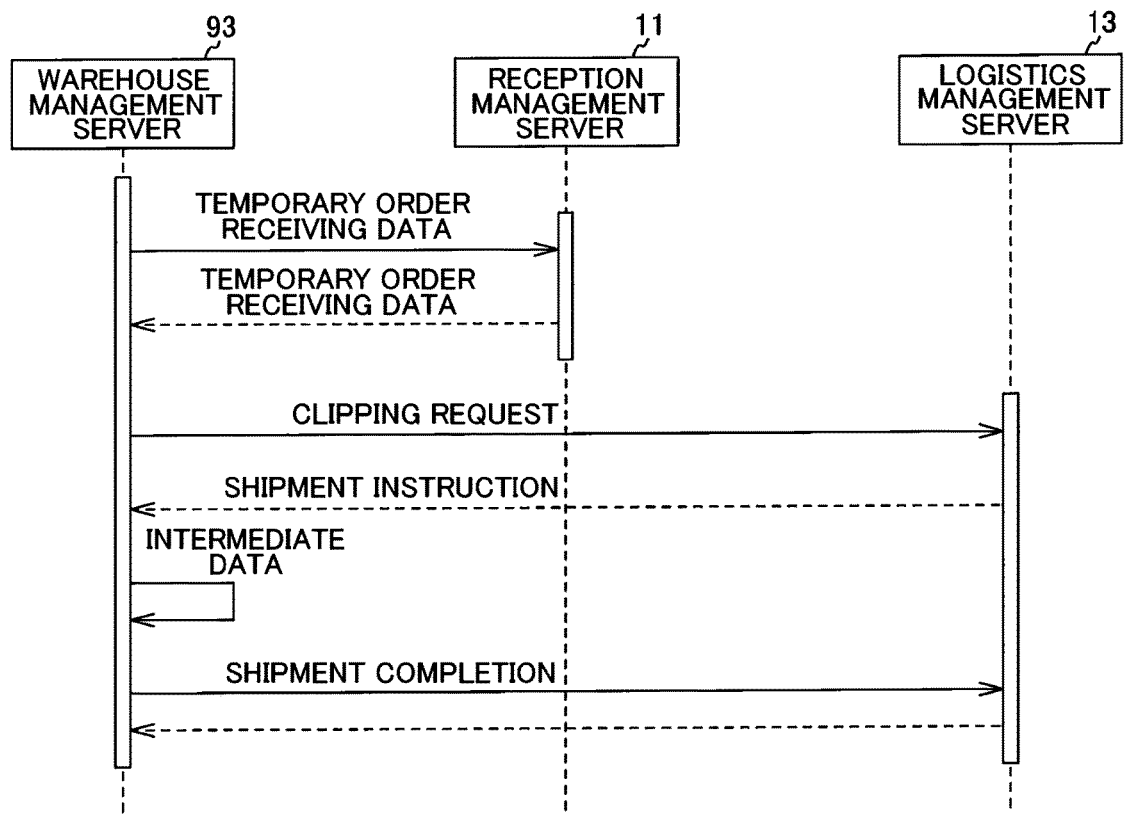
FIG. 7 is a sequence diagram for explaining an order receiving operation performed by the order receiving management server according to the embodiment of the present invention by using a user-specific calendar.

FIG. 7 is a sequence diagram for explaining an order receiving operation performed by the order receiving management server according to the embodiment of the present invention by using a user-specific calendar.

In the sequence diagram, a warehouse management server 93, the order receiving management server 11, and the logistics management server 13 are arranged in this order from the left, and each data flow is indicated by an arrow and explained. Like constituent elements are denoted by like reference signs and explained.

The warehouse management server 93 is a server that is installed in a logistics center per area or the like and manages articles of each warehouse. Although not illustrated in FIG. 1, the warehouse management server 93 is connected to the order receiving management server 11 and the logistics management server 13. For example, the warehouse management server 93 transmits temporary order receiving data to the order receiving management server 11, and the temporary order receiving data is returned thereto from the order receiving management server 11. After the order receiving management server 11 generates the temporary order receiving data, the received order is fixed to generate order receiving (fixed) data in the processing every morning.

The warehouse management server 93 transmits a clipping request indicating that an order is placed with the contents of the temporary order receiving data to the logistics management server 13. When the contents are appropriate, the logistics management server 13 transmits a shipment instruction to the warehouse management server 93. Upon confirmation of intermediate data, the warehouse management server 93 transmits shipment completion data to the logistics management server 13.

<User-Specific Calendar Screen in State of Having No Administration Schedule>

FIG. 8 is a diagram illustrating a user-specific calendar screen in a state of having no administration schedule in the client terminal according to the embodiment of the present invention.

As a precondition of explanation, for example, it is assumed that an article name is "drug A", an article code thereof is "46927098", a customer name is "XX hospital", a customer code thereof is "3", and a patient name is "00000070". A user-specific calendar 101 as illustrated in FIG. 8 is displayed on the initial screen of the client terminal 3.

In this example, there is a title 103 indicating that the screen is a user-specific calendar, the "drug A" is displayed in a frame 105 for the article name (a region specifying an article), and the contents in the frame 105 can be selected by using a pull-down button 107.

Below the frame 105, "XX hospital" is displayed in a frame 109 for a hospital name (a region specifying delivery address data), and the contents in the frame 109 can be selected by using a pull-down button 111. On the right thereof, "00000070" is displayed in a frame 113 for the patient name (a region specifying user identification data), and the contents in the frame 113 can be selected by using a pull-down button 117. Further, the "collective registration" button 129 is provided on the right thereof, which is used in a case where scheduled date registration is performed collectively.

Further, in a region on the lower side thereof, there is a calendar region 119. In this example, a calendar of October 2016 is displayed.

<User-Specific Calendar Screen in State of Having Administration Schedule>

FIG. 9 is a diagram illustrating a user-specific calendar screen in a state of having an administration schedule in the client terminal according to the embodiment of the present invention.

As a precondition of explanation, for example, it is assumed that the article name is "drug A", the article code thereof is "46927098", the customer name is "XX hospital", the customer code thereof is "3", and the patient name is "00000070".

In this example, when a field 121 for selecting the article, hospital, and patient is selected, in the order receiving management server 11, the user-specific calendar generation part 21 displays various marks in corresponding days.

Here, a mark 123 representing "delivery date associated with administration" is displayed on Oct. 11, 2016. The circled number on the mark represents that it is the first delivery date associated with administration. A mark 125 representing "date of administration associated with administration" is also displayed on Oct. 12, 2016. The circled number on the mark represents that it is the first administration. Further, a mark 127 representing "collection date associated with administration" is displayed on Oct. 13, 2016. The circled number on the mark represents that it is the first collection of the delivery unit 17.

<ER Diagrams of User-Specific Calendar Generation Unit>

FIGS. 10(*a*) to (*i*) are ER diagrams of a user-specific calendar generation unit according to the present invention.

With reference to FIGS. 10(*a*), (*b*), and (*c*), an article master 131, an article master 133, and a customer-specific article master 135 are associated with the article code.

Figures 10A, 10B, 10C:
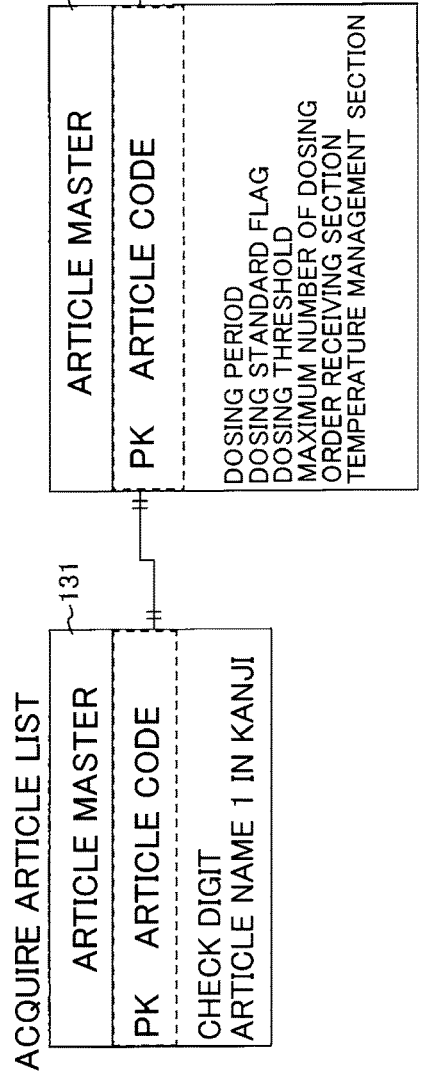

FIG. 10(a) is an ER diagram illustrating the article master 131, and a check digit and article name 1 in kanji are stored in one record with respect to the article code.

FIG. 10(b) is an ER diagram illustrating the article master 133, and dosing period, dosing standard flag, dosing threshold, maximum number of dosing, order receiving section, and temperature management section are stored in one record with respect to the article code.

FIG. 10(c) is an ER diagram illustrating the customer-specific article master 135, and application end date and year, delivery amount, and delivery-date lead time are stored in one record with respect to the customer code, the article code, and an application start date and year.

FIG. 10(d) is an ER diagram illustrating a user master 137, and a user available section is stored in one record with respect to the user ID.

FIG. 10(e) is an ER diagram illustrating a customer-specific article master 139, and application end date and year and delivery amount are stored in one record with respect to the customer code, the article code, and the application start date and year.

FIG. 10(f) is an ER diagram illustrating a patient master 141, and user section, attribute, family name in kanji, given name in kanji, name in kanji, family name in katakana, given name in katakana, name of place of work, type of work, prefecture code, address (prefecture, county) in kanji, city name in kanji, address (prefecture, county) in katakana, city name in katakana, phone number, FAX number, email address, presence of manufacturer's authority, update date, registration date, and time stamp are stored in one record with respect to the customer code and the patient code.

Figure 10I:
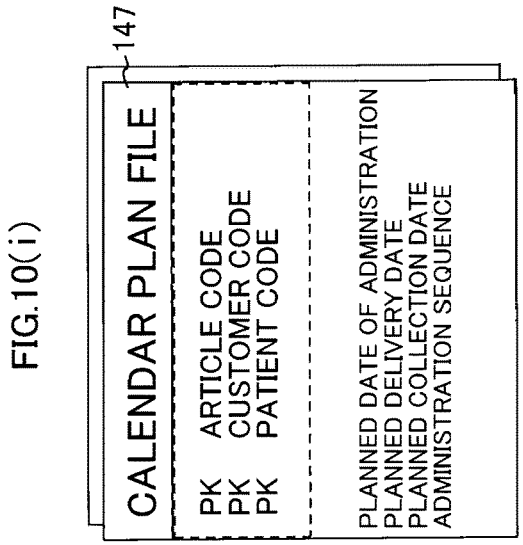
Figure 10H:
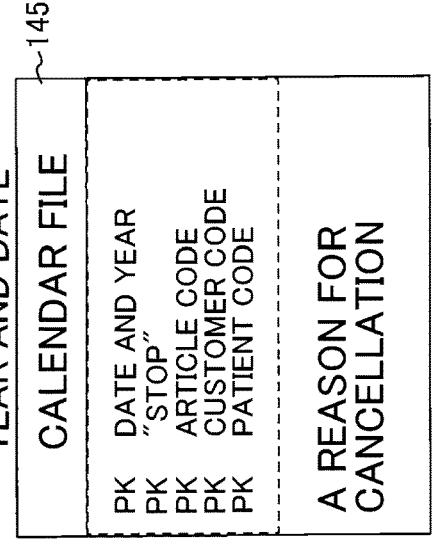
Figure 10G:
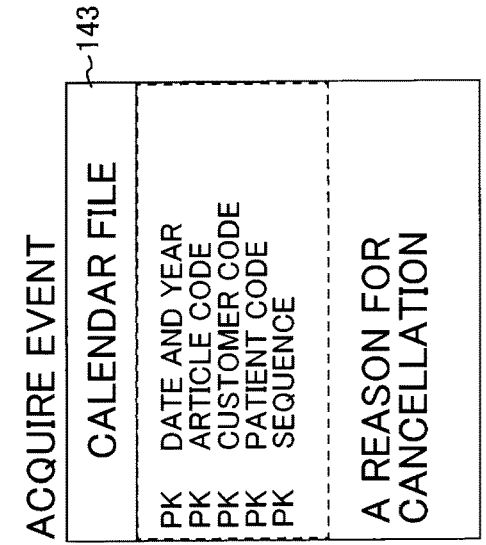

FIG. 10(g) is an ER diagram illustrating a calendar file 143, and a reason for cancellation is stored in one record with respect to the date and year, the article code, the customer code, the patient code, and the sequence.

FIG. 10(h) is an ER diagram illustrating a calendar file 147, and a reason for cancellation is stored in one record with respect to the date and year, "STOP", the article code, the customer code, and the patient code.

FIG. 10(i) is an ER diagram illustrating a calendar plan file 145, and planned date of administration, planned delivery date, planned collection date, and administration sequence are stored in one record with respect to the article code, the customer code, and the patient code.

<ER Diagram of Order-Receiving Data Generation Unit>

FIGS. 11(a) to (c) are ER diagrams of the order-receiving data generation unit according to the present invention.

With reference to FIGS. 11(a), (b), and (c), a customer-specific article master 151, temporary order receiving data 152, and an article master 153 are associated with the article code.

FIG. 11(a) is an ER diagram illustrating the customer-specific article master 151, and application end date and year, delivery amount, delivery date lead time, delivery time, delivery location, collection date, collection time, order optimized pattern, delivery optimized pattern, and collection optimized pattern are stored in one record with respect to the customer code, the article code, and the application start date and year.

FIG. 11(b) is an ER diagram illustrating the temporary order receiving data 152, and operator ID, shipping date, delivery date, time designation, delivery mode, allocated warehouse, article code, order received amount, and order received amount before correction are stored in one record with respect to the customer code, the article code, and an optimum delivery date.

FIG. 11(c) is an ER diagram illustrating the article master 153, and check digit, article name 1 in kanji, article name 2 in kanji, abbreviated article name in kanji, article name 1 in katakana, specification name, abbreviated article name in katakana, handling section, article attribute, set section, specific section, seasonal section, cut section, planting section, number of pallets, returned article section, case shipping section, JAN registration, color code, order placement unit, and cubic capacity section are stored in one record with respect to the article code.

<ER Diagram Illustrating Association with Respective Events>

FIGS. 12(a) to (f) are ER diagrams illustrating association with respective events from an event record of the present invention.

With reference to FIGS. 12(a), (b), (c), (d), (e), and (f), a calendar file 161 and a calendar plan file 163 are associated with the article code, a calendar file 165 and a calendar plan file 167 are associated therewith, and a calendar file 169 and a calendar plan file 171 are associated therewith.

FIG. 12(a) is an ER diagram illustrating the calendar file 161, and event contents, status, time stamp, creation date, creation time, creator ID, on-line update date, on-line update time, on-line update person ID, and deletion flag are stored in one record with respect to the date and year, the article code, the customer code, the patient code, and SEQ.

FIG. 12(b) is an ER diagram illustrating the calendar plan file 163, and the planned frequency of administration, planned delivery date, planned collection date, administration SEQ, delivery SEQ, and collection SEQ are stored in one record with respect to the article code, the customer code, the patient code, and the frequency of administration.

FIG. 12(c) is an ER diagram illustrating the calendar file 165, and event contents, status, time stamp, creation date, creation time, creator ID, on-line update date, on-line update time, on-line update person ID, and deletion flag are stored in one record with respect to the date, the article code, the customer code, the patient code, and the SEQ.

FIG. 12(d) is an ER diagram illustrating the calendar plan file 167, and the planned frequency of administration, planned delivery date, planned collection date, administration SEQ, delivery SEQ, and collection SEQ are stored in one record with respect to the article code, the customer code, the patient code, and the frequency of administration.

FIG. 12(e) is an ER diagram illustrating the calendar file 169, and event contents, status, time stamp, creation date, creation time, creator ID, on-line update date, on-line update time, on-line update person ID, and deletion flag are stored in one record with respect to the date and year, the article code, the customer code, the patient code, and the SEQ.

FIG. 12(f) is an ER diagram illustrating the calendar plan file 171, and the planned frequency of administration, planned delivery date, planned collection date, administration SEQ, delivery SEQ, and collection SEQ are stored in one record with respect to the article code, the customer code, the patient code, and the frequency of administration.

<Flow of Mark Generation Unit>

Figure 13:
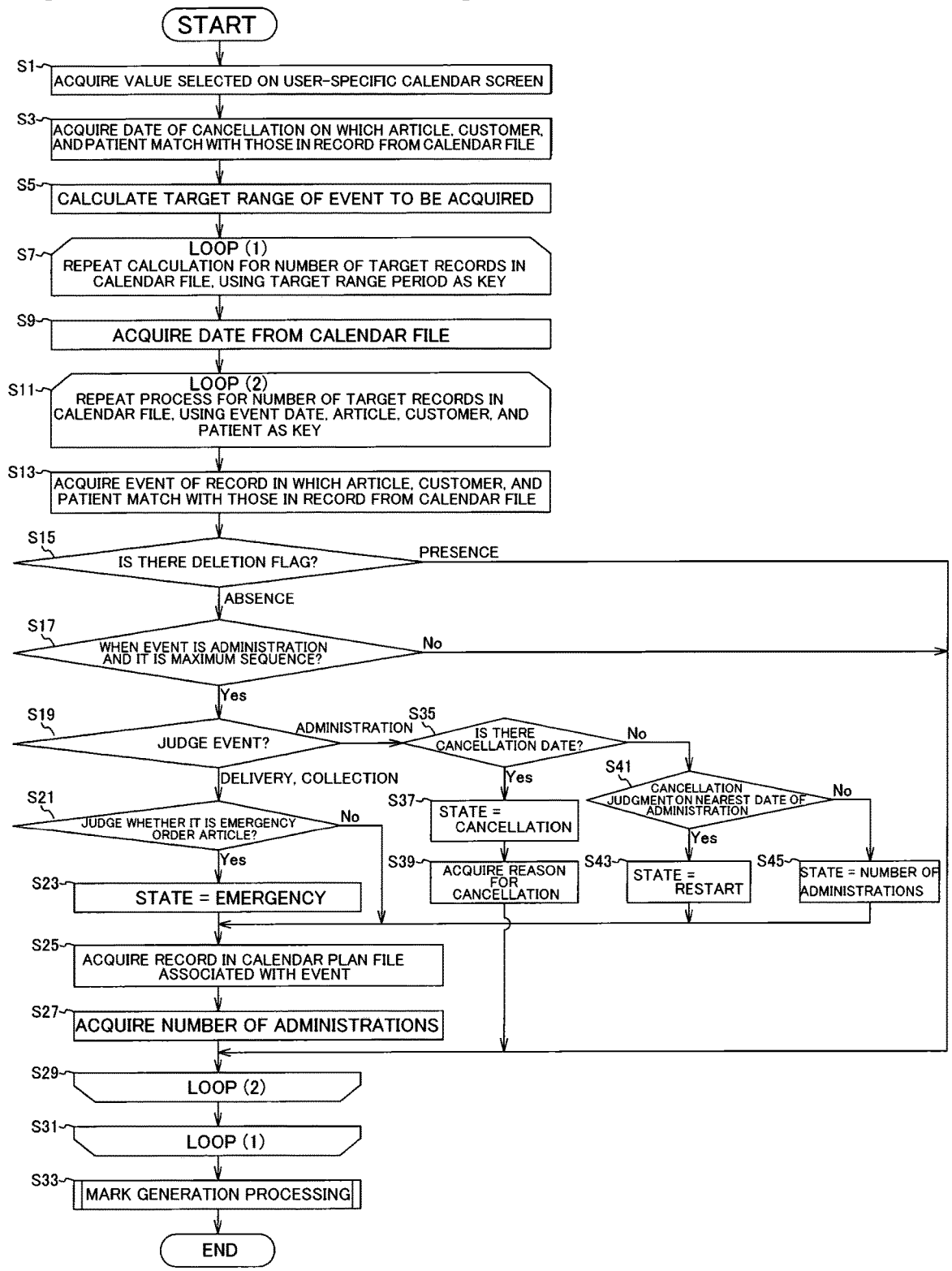
FIG. 13 is a flowchart for explaining an operation of a mark generation unit according to the present invention.

FIG. 13 is a flowchart for explaining an operation of the mark generation unit according to the present invention.

First, the reception part 27 of the order receiving management server 11 acquires values of the article code, the customer code, and the patient code (see FIG. 8) selected on the user-specific calendar screen 101 of the client terminal 3 (S1).

Next, the schedule calculation part 31 of the order receiving management server 11 acquires the date of cancellation on which the article, the customer, and the patient match with those in the record from the calendar file 145 illustrated in FIG. 10(*h*) (S3).

The schedule calculation part 31 then calculates a target range of an event to be acquired (S5).

The schedule calculation part 31 then repeats calculation for the number of target records in the calendar file, using a target range period as a key, as a loop (1) (S7).

The schedule calculation part 31 then acquires the date from the calendar file 143 illustrated in FIG. 10(*g*) (S9).

The schedule calculation part 31 repeats the process for the number of target records in the calendar file 143, using the event date, article, customer, and patient as a key, as a loop (2) (S11).

The schedule calculation part 31 then acquires the event of a record in which the date, the article, the customer, and the patient match with those in the record from the calendar file 143 (S13).

Next, the schedule calculation part 31 searches the presence of a deletion flag in the user master 137 in FIG. 10(*d*). If there is a deletion flag (in the case of presence), the schedule calculation part 31 proceeds to step S29. On the other hand, if there is no deletion flag (in the case of absence), the schedule calculation part 31 proceeds to step S17 to judge whether the event is administration and it is the maximum sequence (S17). Regarding the maximum sequence, a plurality of records may be created according to the status of the record of the same event. Therefore, it is judged that a record to which the maximum sequence is allocated in the records is the latest record, to display the event.

If NO at step S17, the schedule calculation part 31 proceeds to step S29.

On the other hand, if YES at step S17, the schedule calculation part 31 judges the event (S19), and if the event is "delivery and collection", proceeds to step S21 to judge whether the article is an emergency order article (S21). If it is the emergency order article (YES at step S21), the schedule calculation part 31 sets the state as an emergency state (S23) and proceeds to step S25 to acquire a record associated with the event in the calendar plan file 147 (S25).

The schedule calculation part 31 then acquires the frequency of administration (S27) and repeats the loop (2) (S29). When the loop (2) ends, the schedule calculation part 31 repeats the loop (1) (S31). When the loop (1) ends, the schedule calculation part 31 calls a subroutine of the mark generation processing (S33), and when returning from the subroutine, the schedule calculation part 31 ends the processing.

On the other hand, when the event is "administration" at step S19, the schedule calculation part 31 judges whether there is a cancellation date (S35). If there is a cancellation date (in the case of YES), the schedule calculation part 31 cancels the state (S37), acquires a reason for cancellation (S39), and proceeds to step S29.

If there is no cancellation date (in the case of NO) at step S35, the schedule calculation part 31 judges whether there is cancellation of the nearest date of administration (S41). If there is a cancellation judgment on the nearest date of administration (in the case of YES), the schedule calculation part 31 restarts the state (S43) and proceeds to step S25.

If there is no cancellation judgment of the nearest date of administration (in the case of NO) at step S41, the schedule calculation part 31 changes the state to the frequency of administration (S45), and proceeds to step S25.

<Flow of Subroutine of Mark Generation Processing>

FIG. 14(*a*) is a flowchart for explaining an operation of the subroutine of the mark generation processing in the mark generation unit according to the present invention, and FIG. 14(*b*) is a mark table used for the mark generation processing.

When proceeding to step S33 illustrated in FIG. 13, the mark generation part 31*a* generates various marks by referring to the mark table according to the subroutine for performing the mark generation processing.

First, the mark generation part 31*a* judges the event contents included in the calendar files 161, 165, and 169 illustrated in FIG. 12 (S51). When a judgment result is "administration", the mark generation part 31*a* proceeds to step S53 to judge the status (S53).

As a result, when it is the date of administration and the administrations is the third time administration, the mark generation part 31*a* generates an administration mark M55 in which a number "3" is added to an injection mark (S55).

When it is the date of administration and emergency, the mark generation part 31*a* generates an emergency administration mark M57 in which "emergency" is added to the injection mark (S57).

When it is the date of administration and cancellation of administration, the mark generation part 31*a* generates an administration cancellation mark M59 in which "cancellation" is added to the injection mark (S59).

Further, when it is the date of administration and the administration is the tenth time due to restart of administration, the mark generation part 31*a* generates an administration restart mark M61 in which a number "10 (restart)" is added to the injection mark (S61).

As a result of judgment of the event contents (S51), if the event is "delivery", the mark generation part 31*a* proceeds to step S63 to judge the status (S63). As a result, if it is the delivery date and the delivery is the fifth time, the mark generation part 31*a* generates a delivery mark M65 in which a number "5" is added to a mark of delivery vehicle (S65).

If it is the delivery date and the delivery is emergency, the mark generation part 31*a* generates an emergency delivery mark M67 in which "emergency" is added to the mark of delivery vehicle (S67).

As a result of judgment of the event contents (S51), if the event is "collection", the mark generation part 31*a* proceeds to step S69 to judge the status (S69). As a result, if it is the collection date and the collection is the second time, the mark generation part 31*a* generates a collection mark M71 in which a number "2" is added to a mark of collection vehicle (S71).

<Flow of Delivery Date Calculation Processing>

Figure 15:
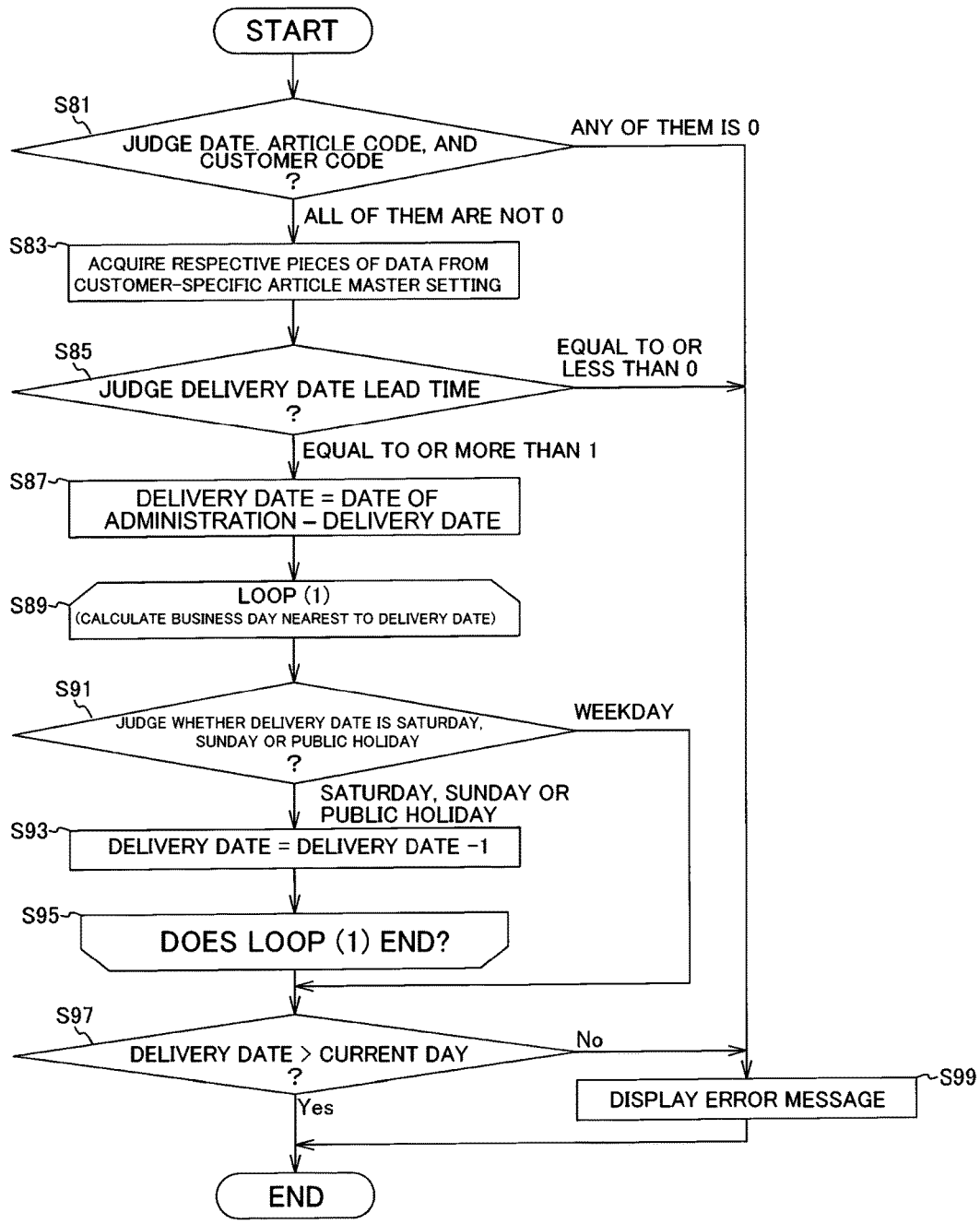
FIG. 15 is a flowchart for explaining an operation in delivery date calculation processing according to the present invention.

FIG. 15 is a flowchart for explaining an operation in delivery date calculation processing according to the present invention.

First, the schedule calculation part 31 judges the date, article code, and customer code (S81). As a result of judgment, if any of these is "0", the schedule calculation part 31 proceeds to step S99 to display an error message (S99) and ends the processing.

If all of these are not "0" at step S81, the schedule calculation part 31 proceeds to step S83 to acquire respective pieces of data from customer-specific article master setting (S83). Details of respective pieces of data are delivery date lead time, delivery time, delivery location, collection date, collection time, and warehouse code.

Next, the schedule calculation part 31 judges the delivery date lead time (S85). As a result of judgment, if the delivery date lead time is equal to or less than "0", the schedule calculation part 31 proceeds to step S99 to display an error message (S99) and ends the processing.

If all of these are equal to or larger than "1" at step S85, the schedule calculation part 31 performs calculation of "delivery date"="date of administration"−"delivery date lead time" (S87).

Next, the schedule calculation part 31 calculates a business day nearest to the delivery date as a loop (1) (S89).

The schedule calculation part 31 performs judgment whether the delivery date is Saturday, Sunday, or public holiday (S91). If the delivery date is a "weekday", the schedule calculation part 31 proceeds to step S97 to judge whether the delivery date is the current day or later (S97). If the delivery date is the current day or later (in the case of Yes), the schedule calculation part 31 ends the processing. If the delivery date is before the current day (in the case of No), the schedule calculation part 31 proceeds to step S99 to display an error message (S99) and ends the processing.

On the other hand, if the delivery date is Saturday, Sunday, or public holiday at step S91, the schedule calculation part 31 proceeds to step S93 to perform calculation of "delivery date"="delivery date"−1 (S93), and repeats calculation until the loop (1) at step S89 ends (S95). The schedule calculation part 31 proceeds to step S97 to judge whether the delivery date is the current day or later (S97). If the delivery date is the current day or later (in the case of Yes), the schedule calculation part 31 ends the processing. If the delivery date is before the current day (in the case of No), the schedule calculation part 31 proceeds to step S99 to display an error message (S99) and ends the processing.

<Flow of Shipping Date Calculation Processing>

Figure 16:
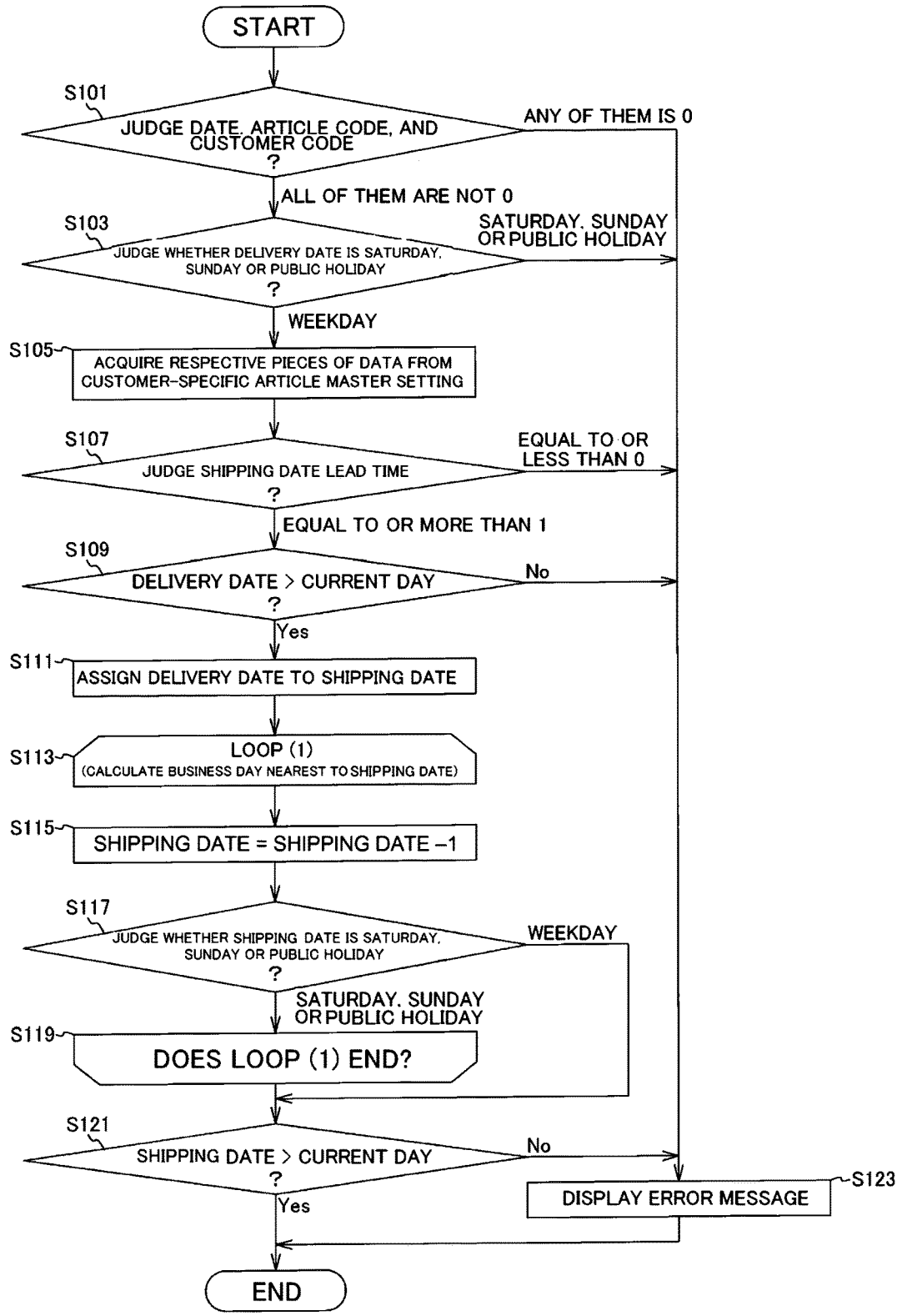
FIG. 16 is a flowchart for explaining an operation of shipping date calculation processing according to the present invention.

FIG. 16 is a flowchart for explaining an operation of shipping date calculation processing according to the present invention.

First, the schedule calculation part 31 judges the date, the article code, and the customer code (S101). As a result of judgment, if any of these is "0", the schedule calculation part 31 proceeds to step S123 to display an error message (S123) and ends the processing.

If all of these are not "0" at step S101, the schedule calculation part 31 proceeds to step S103 to perform judgment whether the delivery date is Saturday, Sunday, or public holiday (S103). If the delivery date is Saturday, Sunday, or public holiday, the schedule calculation part 31 proceeds to step S123 to display an error message (S123) and ends the processing.

If the delivery date is a "weekday", the schedule calculation part 31 proceeds to step S105 to acquire respective pieces of data from the customer-specific article master setting (S105). Details of respective pieces of data are delivery date lead time, delivery time, delivery location, collection date, collection time, warehouse code, and shipping date lead time.

Next, the schedule calculation part 31 judges the shipping date lead time (S107). As a result of judgment, if the shipping date lead time is equal to or less than "0", the schedule calculation part 31 proceeds to step S123, to display an error message (S123) and ends the processing.

If the shipping date lead time is equal to or larger than "1", the schedule calculation part 31 proceeds to step S109, to judge whether the delivery date is the current day or later (S109). If the delivery date is before the current day (in the case of No), the schedule calculation part 31 proceeds to step S123 to display an error message (S123) and ends the processing. If the delivery date is the current day or later (in the case of Yes), the schedule calculation part 31 assigns the delivery date to the shipping date (S111).

Next, the schedule calculation part 31 calculates a business day nearest to the shipping date as a loop (1) (S113), and performs calculation of "shipping date"="shipping date"−"one day" (S115).

The schedule calculation part 31 then performs judgment whether the shipping date is Saturday, Sunday, or public holiday (S117). If the shipping date is a "weekday", the schedule calculation part 31 proceeds to step S121 to judge whether the shipping date is the current day or later (S121). If the shipping date is the current day or later (in the case of Yes), the schedule calculation part 31 ends the processing. If the delivery date is before the current day (in the case of No), the schedule calculation part 31 proceeds to step S123 to display an error message (S123) and ends the processing.

On the other hand, if the shipping date is Saturday, Sunday, or public holiday at step S117, the schedule calculation part 31 proceeds to step S119 to repeat the process until the loop (1) at step S113 ends (119), and proceeds to step S121 to judge whether the shipping date is the current day or later (S121). If the shipping date is the current day or later (in the case of Yes), the schedule calculation part 31 ends the processing. If the shipping date is before the current day (in the case of No), the schedule calculation part 31 proceeds to step S123 to display an error message (S123) and ends the processing.

<Flow of Collection Date Calculation Processing>

Figure 17:
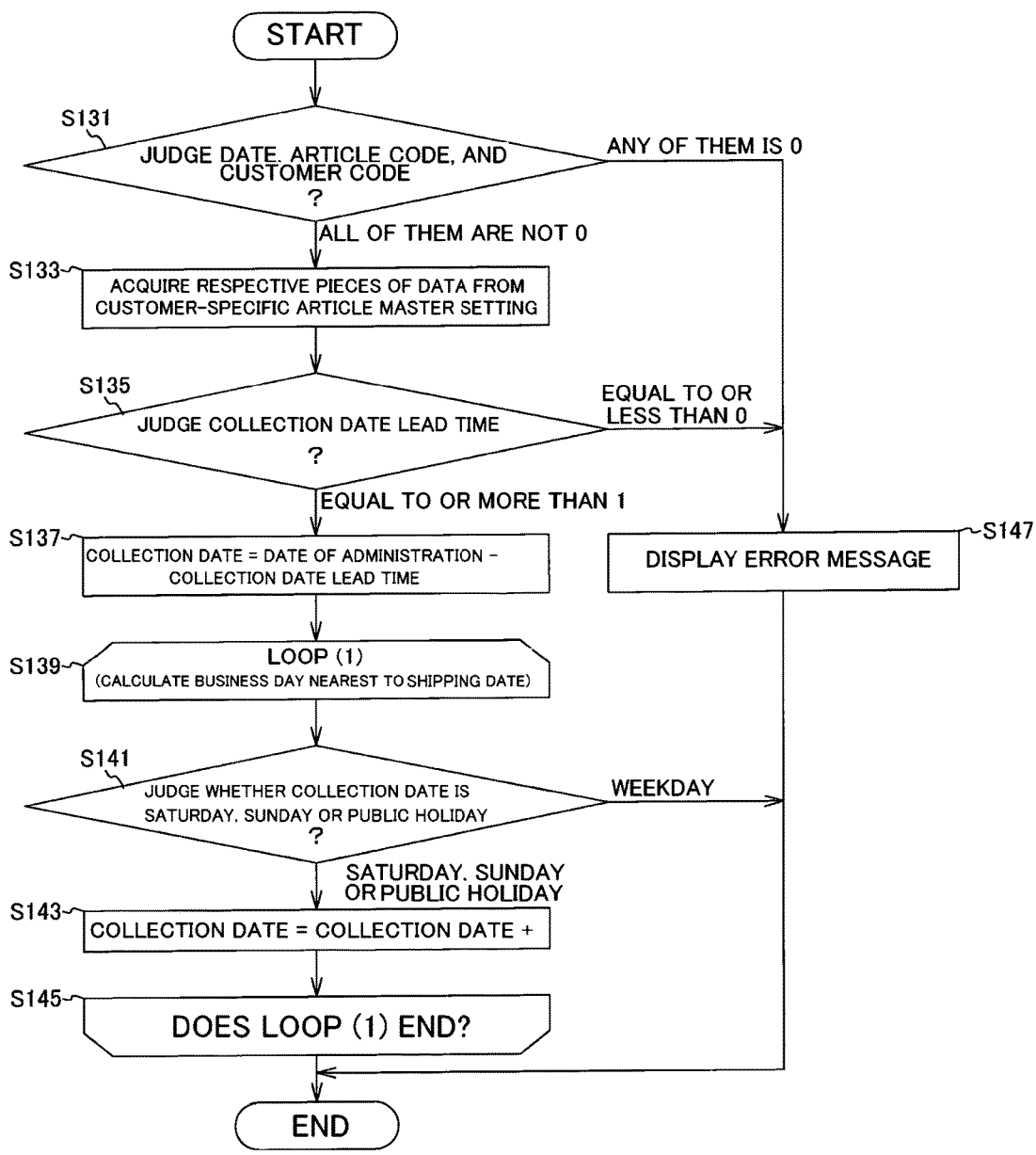
FIG. 17 is a flowchart for explaining an operation of collection date calculation processing according to the present invention.

FIG. 17 is a flowchart for explaining an operation of collection date calculation processing according to the present invention.

First, the schedule calculation part 31 judges the date, the article code, and the customer code (S131). As a result of judgment, if any of these is "0", the schedule calculation part 31 proceeds to step S147 to display an error message (S147) and ends the processing.

If all of these are not "0" at step S131, the schedule calculation part 31 proceeds to step S133 to acquire respective pieces of data from the customer-specific article master setting (S133). Details of respective pieces of data are delivery date lead time, delivery time, delivery location, collection date, collection time, warehouse code, and collection date lead time.

Next, the schedule calculation part 31 judges the collection date lead time (S135). As a result of judgment, if the collection date lead time is equal to or less than "0", the schedule calculation part 31 proceeds to step S147 to display an error message (S147) and ends the processing.

If all of these are equal to or larger than "1" at step S135, the schedule calculation part 31 performs calculation of "collection date"="date of administration"+"collection date lead time" (S137).

Next, the schedule calculation part 31 calculates a business day nearest to the collection date as a loop (1) (S139).

The schedule calculation part 31 performs judgment whether the collection date is Saturday, Sunday, or public holiday (S141). If the collection date is a "weekday", the schedule calculation part 31 ends the processing.

On the other hand, if the collection date is Saturday, Sunday, or public holiday at step S141, the schedule calculation part 31 proceeds to step S143 to perform calculation of "collection date"="collection date"+1 (S143), and repeats calculation until the loop (1) at step S139 ends and ends the processing.

<Configurations, Operations, and Effects of Examples of Aspects of Present Invention>
<First Aspect>

The order receiving management device 7 of the present aspect is an order receiving management device 7 that transmits order receiving data associated with an article having received from the client terminal 3 via the network 5 to the logistics management server 13 of a deliverer who stores the article in the delivery unit 17 and delivers the article to an orderer. The order receiving management device 7 includes the calendar generation part 21 that generates user-specific calendar screen data 23 in which a plurality of date regions are arranged per month, the distribution part 25 that distributes the user-specific calendar screen data 23 to the client terminal 3, the reception part 27 that receives use date data 29 specified in the user-specific calendar screen data 23 from the client terminal 3, and the schedule calculation part 31 that calculates the delivery date data 33a representing a schedule for delivering the article and the collection date data 33b representing a schedule for collecting the carrying delivery unit 17 after being used for delivering the article based on the received use date data 29. The order receiving management device 7 also includes the order-receiving data generation part 35 that generates order receiving data 37 including the delivery date data 33a, the use date data 29, and the collection date data 33b associated with the article, the user identification data 37a of a user who uses the article, and the delivery address data of the article, and the transmission part 39 that transmits the generated order receiving data 37 to the logistics management server 13.

According to the present aspect, the calendar generation part 21 generates the user-specific calendar screen data 23 in which the plurality of date regions are arranged per month. The distribution part 25 distributes the user-specific calendar screen data 23 to the client terminal 3. The reception part 27 receives the use date data 29 specified in the user-specific calendar screen data 23 from the client terminal 3. The schedule calculation part 31 calculates the delivery date data 33a representing the schedule for delivering the article and the collection date data 33b representing the schedule for collecting the carrying unit 17 after being used for delivering the article based on the received use date data 29. The order-receiving data generation part 35 generates the order receiving data 37 including the delivery date data 33a, the use date data 29, and the collection date data 33b associated with the article, the user identification data 37a of a user who uses the article, and the delivery address data of the article. The transmission part 39 transmits the generated order receiving data 37 to the logistics management server 13.

Here, since the order receiving management server 11 generates the order receiving data 37 based on the use date data 29 received from the client terminal 3 and transmits the order receiving data 37 to the logistics management server 13, the stock status of the article can be managed appropriately and efficiently.

Accordingly, not only the delivery schedule of the article but also the collection schedule of the container to be collected can be managed appropriately and efficiently.

<Second Aspect>

The calendar generation part 21 of the present aspect generates the user-specific calendar screen data 23 including an article name frame 105, a patient name frame 113, and a hospital name frame 109.

According to the present aspect, the user-specific calendar generation part 21 can generate the delivery date, the date of administration, and the collection date of a drug required for the patient accurately and quickly by inputting the article name, the patient name, and the hospital name.

Accordingly, the orderer can perform order receiving management appropriately by receiving accurate data with respect to the patient, and can manage a patient treatment schedule and the like accurately.

<Third Aspect>

The schedule calculation part 31 of the present aspect calculates the collection date data 33b and shipping date data representing a schedule for shipping the article, based on the delivery date data 33a calculated based on the use date data 29.

According to the present aspect, the delivery date is determined based on the use date data 29 on which the article is used actually, thereby enabling to determine the shipping data matching with the delivery date and the collection date for collecting the delivery unit 17 after being used.

Accordingly, reduction of a stock loss by appropriate stock management according to need and efficient shipping and collection by performing scheduling of the delivery date become possible.

<Fourth Aspect>

The distribution part 27 of the present aspect distributes the delivery date data 33a and the collection date data 33b calculated by the schedule calculation part 31 onto the user-specific calendar screen displayed on the client terminal 3.

According to the present aspect, a client can recognize the delivery date and the collection date of the delivery unit 17 immediately on the user-specific calendar screen.

Accordingly, a deliverer can confirm the schedule of the delivery date and the collection date beforehand.

<Fifth Aspect>

When the reception part 27 of the present aspect receives collective registration instruction data representing a key operation to a collective registration key 129 included in the user-specific calendar screen data 23 from the client terminal 3, the transmission part 39 transmits the order receiving data 37 to the logistics management server 13.

According to the present aspect, a client can collectively display a plurality of screens on the user-specific calendar screen by collectively registering articles on the user-specific calendar screen.

Accordingly, the operability of the client can be increased.

<Sixth Aspect>

The schedule calculation part 31 of the present aspect includes the mark generation part 31a that generates the delivery date mark 123, the use date mark 125, and the collection date mark 127 respectively representing the delivery date data 33a, the use date data 29, and the collection date data 33b.

According to the present aspect, the delivery date, the use date, and the collection date can be displayed by the marks on the user-specific calendar screen.

Accordingly, the client can know the contents immediately.

<Seventh Aspect>

The distribution part 25 of the present aspect distributes the delivery date mark 123, the use date mark 125, and the collection date mark 127 generated by the mark generation part 31a to the client terminal 3.

According to the present aspect, the delivery date, the use date, and the collection date can be displayed clearly on the screen.

Accordingly, the client can confirm the current status of the articles reliably only by looking at the respective marks.

<Eighth Aspect>

The mark generation part 31a of the present aspect generates marks representing a schedule associated with one article respectively with respect to the delivery date mark 123, the use date mark 125, and the collection date mark 127.

According to the present aspect, respective histories of the delivery date, the use date, and the collection date can be displayed on the screen.

Accordingly, since the client can confirm the user history, wrong administration and unnecessary administration can be prevented from occurring.

<Ninth Aspect>

The order receiving management system 1 of the present aspect includes the order receiving management device 7 described in any one of the first to eighth aspects and the client terminal 3.

According to the present aspect, the system can be easily constructed by the order receiving management device 7 and the client terminal 3.

Accordingly, the system can be configured easily and inexpensively.

<Tenth Aspect>

The client terminal 3 of the present aspect includes the first transmission part 3a that transmits the use date data 29 to the order receiving management device 7 in response to an operation with respect to the user-specific calendar screen data received from the order receiving management device 7, the display control part 3b that executes control to display the delivery date data 33a and the collection date data 33b received from the order receiving management device 7 on the user-specific calendar screen, and the second transmission part 3c that transmits the collective registration instruction data to the order receiving management device 7 in response to an operation with respect to a collective registration key included in the user-specific calendar screen data 23.

According to the present aspect, since the client terminal 3 includes the first transmission part 3a, the display control part 3b, and the second transmission part 3c, transmission and reception of data between the client terminal 3 and the order receiving management device 7 can be performed smoothly.

Accordingly, not only the entire system can be configured simply, but also control of the system becomes easy.

<Eleventh Aspect>

The display control part 3b of the present aspect executes control to display the delivery date mark 123, the use date mark 125, and the collection date mark 127 received from the order receiving management device 7 on the user-specific calendar screen.

According to the present aspect, it suffices that the order receiving management device 7 transmits the pieces of data of respective marks to the client terminal 3, thereby facilitating the entire control.

Accordingly, not only the entire system can be configured simply, but also control of the system becomes easy.

<Twelfth Aspect>

The display control part 3b of the present aspect executes control to display a mark representing that it is a series of schedules associated with one article respectively on the delivery date mark 123, the use date mark 125, and the collection date mark 127 received from the order receiving management device 7.

According to the present aspect, respective histories of the delivery date, the use date, and the collection date can be displayed on the screen.

Accordingly, since the client can confirm the user history, wrong administration and unnecessary administration can be prevented from occurring.

<Thirteenth Aspect>

The order receiving management system 1 of the present aspect includes the order receiving management device 7 described in any one of the first aspect to the eighth aspect, and the logistics management server 13.

According to the present aspect, the system can be easily constructed by the order receiving management device 7 and the logistics management server 13.

Accordingly, the system can be configured easily and inexpensively.

<Fourteenth Aspect>

Upon reception of the order receiving data 37 from the order receiving management device 7, the logistics management server 13 of the present aspect performs allocation processing associated with the article based on the order receiving data 37.

According to the present aspect, the order receiving data 37 includes minimum necessary data regarding the order received. Therefore, the allocation processing associated with the article can be performed based on the data.

Accordingly, the logistics management server 13 can perform accurate order receiving processing only by managing the order receiving data 37.

<Fifteenth Aspect>

The order receiving management method of the present aspect is an order receiving management method that transmits order receiving data associated with an article received from the client terminal 3 via the network 5 to the logistics management server 13 of the deliverer who stores the article in the delivery unit 17 and delivers the article to an orderer. The order receiving management method includes a calendar generation step of generating user-specific calendar screen data 23 in which a plurality of date regions are arranged per month, a distribution step of distributing the user-specific calendar screen data 23 to the client terminal 3, a reception step of receiving use date data 29 specified in the user-specific calendar screen data 23 from the client terminal 3, a schedule calculation step of calculating the delivery date data 33a representing a schedule for delivering the article and the collection date data 33b representing a schedule for collecting the delivery unit 17 after being used for delivering the article based on the received use date data 29, an order-receiving data generation step of generating the order receiving data 37 including the delivery date data 33a, the use date data 29, and the collection date data 33b associated with the article, the user identification data 37a of a user who uses the article, and delivery address data of the article, and a transmission step of transmitting the generated order receiving data 37 to the logistics management server 13.

According to the present aspect, the order receiving management server 11 generates the order receiving data 37 based on the use date data 29 received from the client terminal 3 and transmits the order receiving data 37 to the logistics management server 13. Therefore, the stock status of the article can be managed appropriately and efficiently.

Accordingly, not only the delivery schedule of the article but also the collection schedule of the container to be collected can be managed appropriately and efficiently.

<Sixteenth Aspect>

A program of the present aspect causes a processor to perform respective steps in the order receiving management method described in the fifteenth aspect.

According to the present aspect, the respective steps can be executed by the processor. Therefore, not only the delivery schedule of the article but also the collection schedule of the container to be collected can be managed appropriately and efficiently.

REFERENCE SIGNS LIST

1 . . . order receiving management system, 3 . . . client terminal, 5, 15 . . . network, 7 . . . order receiving management device, 9 . . . front-end server, 11 . . . order receiving management server, 13 . . . logistics management server, 17 . . . delivery unit, 21 . . . calendar generation part, 23 . . . user-specific calendar screen data, 25 . . . distribution part, 27 . . . reception part, 29 . . . use date data, 31 . . . schedule calculation part, 35 . . . order-receiving data generation part, 37 . . . order receiving data, 39 . . . transmission part.

The invention claimed is:

1. An order receiving management system provided with an order receiving management device and an order terminal, the order receiving management device provided with an HDD that stores a program, a memory, a CPU that executes a control processing according to a program read from the HDD to the memory and a communication unit that connects to a communication network, the order receiving management device connecting with a logistics management server of a deliverer via a communication network, wherein:

the orderer terminal transmits a user-specific calendar request to the order receiving management device via the communication network;

when the order receiving management device receives the user-specific calendar request from the orderer terminal via the communication network, the CPU controls the HDD so as to read data relating to a plurality of regions for forming screen data from the HDD and write them in the memory, the CPU controls to write calendar screen data in the memory based on the data relating to a plurality of regions read from the memory so as to include a region for specifying an article code, a region for specifying a user identification data, a region for specifying a delivery address data of the article, and a calendar grid displaying a plurality of date regions per month, that specifies a use date data, and the CPU controls the HDD so as to write the calendar screen data read from the memory in the HDD;

the CPU acquires an article list including article names associated with a plurality of article codes from the HDD in the memory, the CPU acquires a hospital list including hospital names associated with a plurality of hospital codes from the HDD in the memory, the CPU acquires a patient list including patient names associated with a plurality of patient codes from the HDD in the memory, the CPU reads the article list, the hospital list, the patient list, and the calendar screen data from the memory and controls the communication unit to distribute to the orderer terminal through the communication unit via the communication network;

wherein the orderer terminal, receives the article list, the hospital list, the patient list and the calendar screen data from the order receiving management device via the communication network and displays a calendar grid consisting of the calendar screen data as a graphical user interface, reads article names from the article list and updates the graphical user interface, reads hospital names from the hospital list and updates the graphical user interface, and reads patient names from the patient list and updates the graphical user interface, in response to reading the article names, displays the article names in an area for specifying the article code including a pull-down button, and acquires a selected article code selected from the pull-down button of the area for specifying the article code, in response to reading the hospital names, displays the hospital names in an area for specifying the delivery address data of the article including a pull-down button, and acquires a selected hospital code as delivery address data selected from the pull-down button of the area for specifying the delivery address data of the article, in response to reading the patient names, displays the patient names in an area for specifying the user identification data including a pull-down button, and acquires a selected patient code as user identification data selected from the pull-down button of the area for specifying the user identification data, specifies a use data in the calendar grid, and in response, acquires a specified use date, transmits the acquired article code, user identification data, delivery address data, one or more use dates, and one or more number of uses to the order receiving management device via the communication network;

wherein, at the order receiving management device, the CPU controls the communication unit so as to receive the article code, the user identification data, the delivery address data, and the one or more use dates and the one or more number of uses sent from the orderer terminal and write it in the memory through the communication unit via the communication network;

the CPU controls the HDD so as to read a first check digit from an article master stored in the HDD and write it in the memory by using the article code as a key, the CPU controls to compare a second check digit included in the article code read from the memory and the first check digit and check correctness of the article code, the CPU controls the HDD to read the user identification data, the delivery address data, and the one or more use dates and the one or more number of uses from the memory and write them in the HDD when the article code is correct;

the CPU controls to perform an error determination as to whether the article code read from the memory is 0, and when the article code is other than 0, the CPU controls the HDD to read a delivery date lead time and a collection date lead time from a customer-specific article master stored in the HDD and write them to the memory, the CPU controls to calculate one or more delivery dates obtained by subtracting the delivery date lead time, which represents a time from shipment of the article corresponding to the delivery address data of the article to delivery to a delivery address, from the one or more use dates read from the memory, the CPU controls the HDD so as to read the one or more delivery dates from the memory and write it in the HDD, and the CPU controls to calculate one or more collection dates obtained by adding the collection date lead time, which represents a time from use of the article corresponding to the delivery address data of the article to collection of the container, to the one or more use dates using the article in the memory, the CPU controls the HDD so as to read the one or more collection dates from the memory and write it in the HDD;

the CPU controls the HDD so as to read order receiving data in the memory including the one or more delivery dates, the one or more use dates, and the one or more collection dates associated with the article, user identification data of a user who uses the article, and the delivery address data of the article from the HDD to the memory, the CPU calculates, based on the one or more number of uses, one or more number of deliveries and one or more number of collections corresponding to the one or more number of uses, the CPU controls to generate the one or more delivery dates and the one or more number of deliveries, the one or more use dates and the one or more number of uses, the one or more collection dates and the one or more number of collections, the user identification data, and the delivery address data read from the memory as the order receiving data;

the CPU controls the communication unit so as to read the order receiving data from the memory and transmits to the logistics management server through the communication unit via the communication network, a mark table stored in the HDD stores delivery date mark data, use date mark data, and collection date mark data, which are image data representing the one or more delivery dates, the one or more use dates, and the one or more collection dates, respectively, the mark table stored in the HDD also stores a number of deliveries mark data, a number of uses mark data, and a number of collections mark data, which are image data representing the one or more number of deliveries, the one or more number of uses, and the one or more number of collections, respectively, the CPU controls the HDD so as to read the one or more number of deliveries, the one or more number of uses, and the one or more number of collections from the HDD and write them in the memory, controls the HDD so as to read a mark table from the HDD and write it in the memory based on the one or more number of deliveries, the one or more number of uses, and the one or more number of collections read from the memory, and controls the memory to read one or more of the delivery date mark data, one or more of the use date mark data, and one or more of the collection date mark data corresponding to the one or more number of deliveries, the one or more number of uses, and the one or more number of collections respectively from the mark table stored in the memory, the CPU controls the communication unit so as to read the one or more delivery dates and the one or more of the delivery date mark data, the one or more use dates and the one or more of the use date mark data, the one or more collection dates and the one or more of the collection date mark data f rom the memory, and distributes them to the orderer terminal via the communication network through the communication unit;

the orderer terminal, receives the one or more delivery dates and the one or more of the delivery date mark data, the one or more use dates and the one or more of the use date mark data, and the one or more collection dates and the one or more of the collection date mark data from the order receiving management device via the communication network, updates a display of graphical icons representing the one or more number of deliveries of articles consisting of the one or more of the delivery date mark data so that they overlap with each of the one or more delivery dates in the calendar grid of the graphical user interface, updates a display of graphical icons representing the one or more number of uses consisting of the one or more of the use date mark data so that they overlap with each of the one or more use dates in the calendar grid of the graphical user interface, and updates a display of graphical icons representing the one or more number of collections consisting of the one or more of the collection date mark data so that they overlap with each of the one or more collection dates in the calendar grid of the graphical user interface.

* * * * *